US011620341B1

(12) United States Patent
Preis et al.

(10) Patent No.: US 11,620,341 B1

(45) Date of Patent: Apr. 4, 2023

(54) INDUSTRIAL VIRTUAL ASSISTANT PLATFORM WITH ROBOTIC PROCESS AUTOMATION FOR KNOWLEDGE AND INSIGHTS MANAGEMENT

(71) Applicant: TeamSolve Pte. Ltd., Singapore (SG)

(72) Inventors: Amitsur Preis, Oakville (CA); Michael Peter Allen, Kenil Worth (GB); Muhammad Mudasser Iqbal, Singapore (SG); Wong Loo Ping Robin, Singapore (SG)

(73) Assignee: TeamSolve Pte. Ltd., Singapore (SG)

( * ) Notice: Subject to any disclaimer, the term of this patent is extended or adjusted under 35 U.S.C. 154(b) by 0 days.

(21) Appl. No.: 17/953,924

(22) Filed: Sep. 27, 2022

Related U.S. Application Data

(63) Continuation-in-part of application No. 17/700,407, filed on Mar. 21, 2022, now Pat. No. 11,455,547.

(60) Provisional application No. 63/307,595, filed on Feb. 7, 2022.

(51) Int. Cl.

| | |
|---|---|
| ***G06F 16/9032*** | (2019.01) |
| ***G06N 20/00*** | (2019.01) |
| ***G06N 5/04*** | (2006.01) |
| ***G06N 5/02*** | (2006.01) |

(52) U.S. Cl.

CPC ......... *G06F 16/90332* (2019.01); *G06N 5/02* (2013.01); *G06N 5/04* (2013.01); *G06N 20/00* (2019.01)

(58) Field of Classification Search

CPC ...... G06F 16/90332; G06N 5/02; G06N 5/04; G06N 20/00

USPC .............................................................. 706/1

See application file for complete search history.

(56) References Cited

U.S. PATENT DOCUMENTS

| | | | |
|---|---|---|---|
| 2019/0392325 | A1 | 12/2019 | Lange et al. |
| 2021/0012774 | A1 | 1/2021 | Sureka |
| 2021/0279563 | A1 | 9/2021 | Sgobba et al. |

*Primary Examiner* — Thierry L Pham

(74) *Attorney, Agent, or Firm* — Galvin Patent Law LLC; Brian R. Galvin; Brian S. Boon

(57) ABSTRACT

An Industrial Virtual Assistant (IVA) platform with Robotic Process Automation that operates like a Digital Knowledge Companion and allows operational staff at industrial facilities to have natural language conversations with the IVA to obtain information about, and to control operations of, industrial facilities, and which automates certain processes based in part on those natural language conversations. In an embodiment, the platform uses a Robotic Process Automater (RPA) to ingest information from documentation, human inputs, and operational data from the facility, organize that information into a knowledge graph containing comprehensive facility information, and apply machine learning algorithms to the knowledge graph to provide natural language responses to human queries and to automate certain processes of the facility.

12 Claims, 24 Drawing Sheets

INDUSTRIAL VIRTUAL ASSISTANT PLATFORM WITH ROBOTIC PROCESS AUTOMATION FOR KNOWLEDGE AND INSIGHTS MANAGEMENT

CROSS-REFERENCE TO RELATED APPLICATIONS

Priority is claimed in the application data sheet to the following patents or patent applications, the entire written description of each of which is expressly incorporated herein by reference in its entirety:

Ser. No. 17/700,407

63/307,595

BACKGROUND

Field of the Art

The disclosure relates to the field of process automation, and more particularly to the field of process automation in industrial facilities.

Discussion of the State of the Art

The utility and industrial sectors are experiencing a decline in sufficiently knowledgeable operational staff which is limiting day-to-day operations in these industries, leading to loss of revenue and potentially damaging the public image of the entities involved. While there are a number of reasons for this decline, a major cause is the retirement of older staff whose breadth of operational knowledge is often lost upon their retirement. Even where documentation exists, a great deal of real-world operational knowledge of the particular facility (e.g., finicky pumps, undocumented heat issues, etc.) is often lost.

Further exacerbating the operational knowledge problem is the fact that all facilities more than a few years old rely on older and/or outdated technology. Older software tools for process controls and other facilities operations are not intuitive in their setup and operation. Their user interfaces are limited to traditional tools such as graphs, dashboards, and complex menu systems. Even newer facilities with modern software have complicated user interfaces that require detailed knowledge to operate. Moreover, these interfaces are inflexible, requiring extensive training and background knowledge to navigate through them to find the relevant controls and information.

Additionally, systems in industrial facilities that detect errors and anomalies have simplistic, hard-coded rules that must be properly interpreted by domain experts to determine the cause and solution. Depending on the type and complexity of the incident, many different sets of rules may be applicable, and the domain expert must know which rules apply. This type of operational knowledge is exceedingly difficult to transfer to less experienced operational staff, and currently-available knowledge systems are incapable of adapting to the level of complexity required to assist in the operation of industrial facilities.

Such users would rather be served better if they can have an intuitive "conversation" with the system to "inform" of new situations that should be taken into consideration when detecting incident anomalies and providing insights, as well as automating certain processes based on a combination of documentation, natural language user interactions, and real-time operational data from the system.

To overcome these operational knowledge difficulties, what is needed is an Industrial Virtual Assistant (IVA) platform with robotic process automation that allows operational staff at industrial facilities to have natural language conversations with the IVA to obtain information about, and to control operations of, industrial facilities, and which automates certain processes based in part on those natural language conversations.

SUMMARY

Accordingly, the inventor has conceived and reduced to practice, an Industrial Virtual Assistant (IVA) platform with Robotic Process Automation that operates like a Digital Knowledge Companion and allows operational staff at industrial facilities to have natural language conversations with the IVA to obtain information about, and to control operations of, industrial facilities, and which automates certain processes based in part on those natural language conversations. In an embodiment, the platform uses a robotic process automater (RPA) to ingest information from documentation, human inputs, and operational data from the facility, organize that information into a knowledge graph containing comprehensive facility information, and apply machine learning algorithms to the knowledge graph to provide natural language responses to human queries and to automate certain processes of the facility.

According to a preferred embodiment, a robotic process automation system is disclosed, comprising: a computing device comprising a memory, a processor, and a non-volatile data storage device; a knowledge graph stored on the non-volatile data storage device, wherein the knowledge graph comprises nodes representing things and edges representing relationships between the things; a robotic process automater comprising a first plurality of programming instructions stored in the memory which, when operating on the processor, causes the computing device to: receive data about a facility to be automated, the data comprising: one or more human inputs; one or more documents; and one or more operational data streams from the system; store the received data in the knowledge graph; process a portion of the knowledge graph through a domain machine learning algorithm to obtain an inference about the facility not contained in the received data; store the inference as part of the knowledge graph; receive a query about the facility related to the inference; process the query and a portion of the knowledge graph through a context recognition machine learning algorithm to determine a context in which the query was made; process the context and a portion of the knowledge graph through the domain machine learning algorithm to: generate a response to the query; and determine whether the inference can be generalized to the context of the query; and store the determination as part of the knowledge graph.

According to another preferred embodiment, a method for operating a robotic process automation system is disclosed, comprising the steps of: storing a knowledge graph a non-volatile data storage device of a computing device comprising a memory, a processor, and a non-volatile data storage device, wherein the knowledge graph comprises nodes representing things and edges representing relationships between the things; using a robotic process automater operating on the computing device to: receiving data about a facility to be automated, the data comprising: one or more human inputs; one or more documents; and one or more operational data streams from the system; store the received data in the knowledge graph; process a portion of the knowledge graph through a domain machine learning algorithm to obtain an inference about the facility not contained in the received data; store the inference as part of the knowledge graph; receive a query about the facility related to the inference; process the query and a portion of the knowledge graph through a context recognition machine learning algorithm to determine a context in which the query was made; process the context and a portion of the knowledge graph through the domain machine learning algorithm to: generate a response to the query; and determine whether the inference can be generalized to the context of the query; and store the determination as part of the knowledge graph.

According to an aspect of an embodiment, the query is a natural language query from a person and the response is provided as a natural language response using a natural language understanding (NLU) engine.

According to an aspect of an embodiment, the natural language understanding (NLU) engine comprises a natural language processing machine learning algorithm trained in part on a domain-specific taxonomy for a domain related to the facility.

According to an aspect of an embodiment, the natural language processing machine learning algorithm is further trained on information from the knowledge graph to enhance its domain-specific taxonomy recognition. According to an aspect of an embodiment, the query is an automated query from a component of the facility and the response is a control recommendation sent to a supervisory control and data acquisition (SCADA) module to generate a control signal.

According to an aspect of an embodiment, the information from the inferences about the facility stored in the knowledge graph are analyzed over time to identify long term patterns which have not been provided by the received data about the facility.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
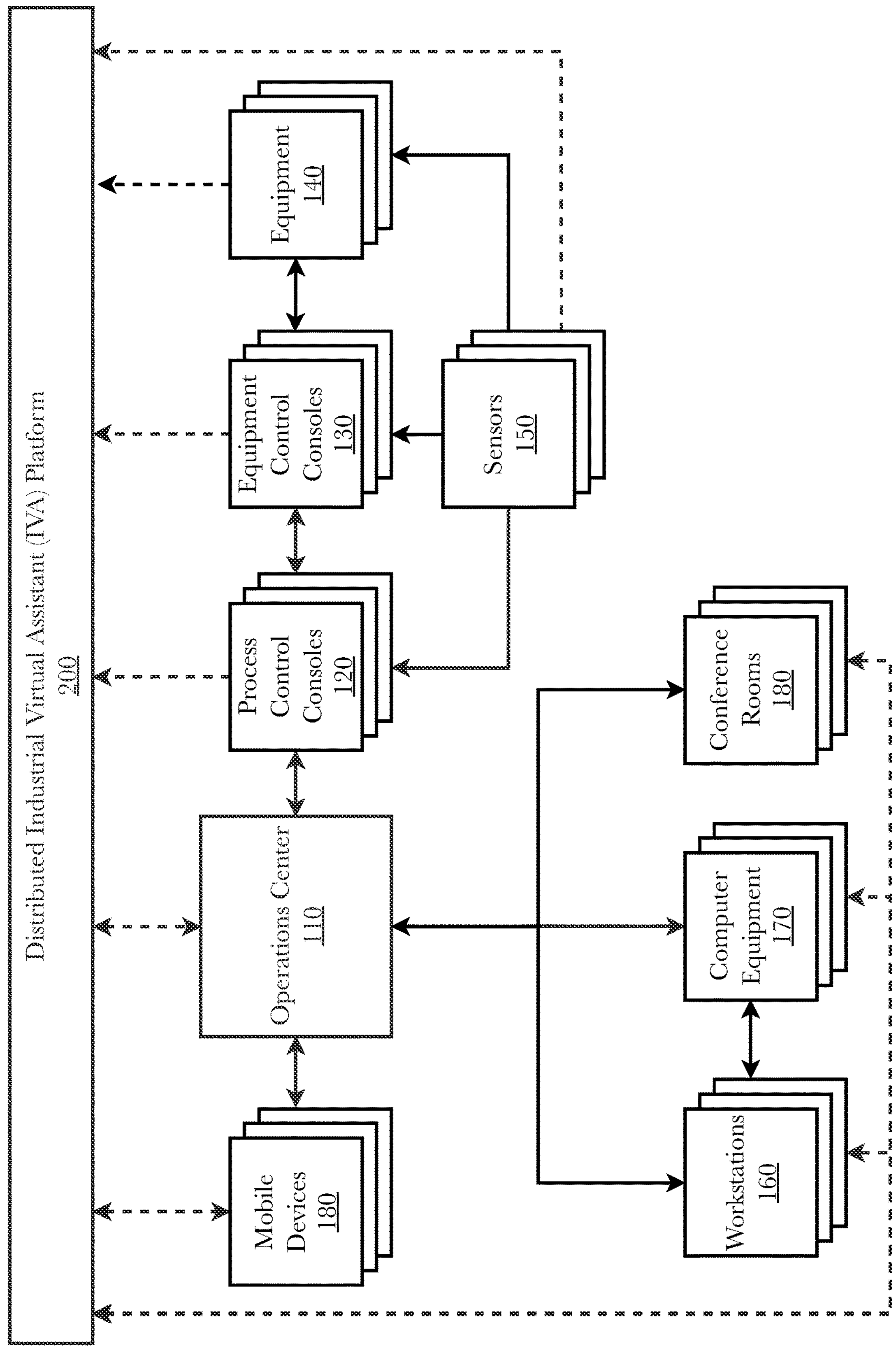
FIG. 1 is a block diagram illustrating integration of a distributed industrial virtual assistant platform into an industrial facility.

The inventor has conceived, and reduced to practice, an Industrial Virtual Assistant (IVA) platform with robotic process automation that allows operational staff at industrial facilities to have natural language conversations with the IVA to obtain information about, and to control operations of, industrial facilities, and which automates certain processes based in part on those natural language conversations. In an embodiment, the platform uses a robotic process automater (RPA) to ingest information from documentation, human inputs, and operational data from the facility, organize that information into a knowledge graph containing comprehensive facility information, and apply machine learning algorithms to the knowledge graph to provide natural language responses to human queries and to automate certain processes of the facility.

The industrial virtual assistant platform assists engineers and other facilities staff by simplifying interactions with facility equipment, hardware, and software. Modern industrial facilities have complicated process control systems which require highly trained staff to operate. Many of those process control systems use archaic hardware and software, requiring very specialized knowledge and making interactions with the systems difficult. A industrial virtual assistant platform simplifies the process of interacting with such facilities by allowing natural language querying and control of the facility. For example, utilities like water companies and electric companies have many large and expensive pumps that move water, fuel, coolant, etc. around. The knowledge in the industrial pumps' domain is highly specialized, but with a cloud-based IVA pump technicians can ask for the information they need when needed without being trained in all the aspects of each differing pump.

Additionally, by learning experientially, the IVA can become the repository of operational wisdom that can be retained through changes of facility staff over time. Rather than asking retiring workers and engineers to manually document their knowledge, the workers and engineers can simply work day-to-day with an IVA that can begin to understand how the experienced workers and engineers respond to each event. Each parameter of the equipment in the facility can be digitally logged, every interaction with equipment or change in operational processes can be tracked, and machine learning can used to make predictions about facility operations. For example, the hardware, software, and situational parameters that lead up to a specific event can be processed through machine learning algorithms to understand how to respond to a similar event in the future. In an embodiment, the platform uses a robotic process automater (RPA) to ingest information from documentation, human inputs, and operational data from the facility, organize that information into a knowledge graph containing comprehensive facility information, and apply machine learning algorithms to the knowledge graph to provide natural language responses to human queries and to automate certain processes of the facility.

One of the problems that the distributed Industrial Virtual Assistant (IVA) platform is designed to solve is that systems in industrial facilities that detect errors and anomalies have hard-coded rules that cannot be easily modified to adapt to changing conditions or processes. In the past, dynamic learning through employing various AI and machine learning methods has been limited to enhancing detection/prediction capabilities on individual datasets rather than on enhancing the rules themselves that define the criteria for detecting an incident, including new unstructured knowledge requiring engineering efforts to enhance the analytics engine's capabilities. Part of the problem with training such AI systems for feedback and control of industrial facilities is that domain-expert users themselves find it hard to express their understanding of how the incident detection rules should evolve in a structured fashion, as expected by such limited underlying systems. Depending upon how complex the incident and underlying phenomena is, there might be many different sets of rules that are applicable in different situations, and domain experts often assimilate and make decisions intuitively based on their experience in the field and with a particular facility or its equipment. It is difficult to express such variability in rules and yet have the detection system apply the best rules given specific circumstances.

The distributed Industrial Virtual Assistant (IVA) platform addresses this problem by having a virtual assistant architecture wherein users can have natural-language conversations to train the IVA on equipment, domain concepts, and common tasks. This is similar to training a new employee. The IVA will also learn from a user's behavior and will over time adapt to personal preferences. The IVA will know what a given user's job is, where he or she is located, and what he or she needs on a day-to-day basis. Relevant information will be delivered to the user automatically. The learning of the user's job will also benefit other companies because the data can be anonymized and sent back to the cloud to inform a more general machine learning model that applies to that job across the whole sector.

Through adaptive learning of domain specific concepts and contexts (e.g., energy, sewer, electric, and water systems), the IVA can respond to user queries involving such concepts using industry vernacular and nomenclature. For example, a facility manager/engineer might ask (by voice or text) the industrial virtual assistant that may be installed on his or her mobile device "What the fluid pressure is at a certain pumping station during time interval x?" In this case, the industrial virtual assistant has the relevant domain expertise to understand the correct meaning of the technical terms: "fluid pressure," "in the pumping station," and "at time interval x." With this understanding, the virtual assistant can find the relevant asset ID in the facility asset database, locate the relevant fluid pressure sensor ID in the SCADA system, and retrieve the relevant fluid pressure data from the sensor (either in real time or from stored data) at the required time point. Thereafter, the industrial virtual assistant will respond to the user (voice or text) with the following answer: "the fluid pressure in pump x in location y and at time z is w psi." This will also allow the organization to achieve its operational goals with minimal impact related to shortages in skilled labor.

In an embodiment, the IVA platform is initially provided with a facilities asset database containing information about equipment, components, sensors, and processes, and is connected to process control software and/or equipment control software of the facility such that information about the current status of the facility (e.g., equipment operational statuses, sensor data, flow controls, current processes in operation, etc.) can be accessed by the IVA platform. The facilities asset database may contain knowledge not only about the facilities assets (e.g., tank capacities, pipe capacities and flow rates, pump pressures, etc.), but also about processes within the facility (e.g., flow rates are not allowed to exceed a certain rate during certain operations, increasing processing volumes of a given operation will reduce efficiency by a certain percentage, etc.), such that machine learning algorithms can be trained to provide context-sensitive and domain-sensitive responses to user queries based on these databases. As users interact with an IVA instance and/or the IVA platform, these domain-specific knowledge databases are updated by continual re-training of machine learning algorithms based on exceptions and/or incidents identified during the interactions. As one example, if a domain-specific knowledge database for pumps indicates that a particular pump should be operating at a minimum pressure of 100 psi, but an operator determines that a given process works better if the pump is operated at 90 psi, the system will learn that the preferred operation for that pump is 90 psi, not 100 psi.

The IVA platform may comprise one or more domain-specific knowledge databases, each containing rules about that domain of knowledge that can be modified over time by training and re-training of machine learning algorithms using voice, text, and visual interactions with users and/or equipment over a period of time to determine which actions and behaviors govern incidents. The rules may include checking on one or multiple exceptions, existence of various conditions, simple statistical checks on various data sets and even including static meta information about the assets involved. For each incident type, the IVA may be provided different sets of rules over time. The IVA platform's backend dynamically builds a convergence map that guides it to apply the best set of rules and make a highly accurate incident detection and classification for similar future incidents, thereby eliminating the laborious work by domain experts and operators of having to check various datasets and exceptions manually. The IVA, after selecting the best set of rules, automatically performs the checks and brings actionable insights to the users, saving significant amount of time during time critical incident response scenarios.

The IVA does more than domain learning, the IVA also learns complex incident behaviors (e.g., in industrial/utility processes). From these complex incident behaviors, the IVA can learn to connect data from various systems and over time to anticipate problems and prescribe actions to users. The IVA can be trained on vendor-specific equipment allowing companies to expertly craft interactions between an IVA instance, a given user, and relevant facility assets, equipment, or processes.

The IVA may learn during the occurrence of incidents and use exception-based learning (e.g., from users handling an incident not covered by existing rules). The IVA may have a switching mode whereby users can set an IVA instance to engage either active or passive learning or a combination of the two. The IVA may have a retroactive learning mode, whereby after an incident, engineers/staff instruct the IVA to go back in time and behave as if live streams of data were coming in, and then provide the IVA with curated responses that the engineers and staff would have taken to minimize the consequences of the event. With enough retroactive training, the IVA can begin to take the same corrective actions in the future during the same or even similar events.

A cloud-based industrial virtual assistant can be used in any domain and across many domains simultaneously. Core computing (for the IVA platform, for example) may be configured to happen in the cloud with domain-specific and user-specific IVAs for certain users or groups. For more security-sensitive applications, the IVA platform or IVA instances can be implemented on a company's intranet or compartmentalized networks such as secret and top-secret governmental networks. Data can be anonymized from company-to-cloud for enhanced learning at a high-level domain category beneficial to all users within that domain or across the entire cloud-based IVA platform.

The IVA may train machine learning models on diagrams, schematics, and manuals, plus events, incidents, and human behavioral responses. For example, the IVA may learn a given user's daily routine, and automatically provide certain information to that user at specific times of the day. The IVA may have access to files for displaying on devices and sending across a network. In some embodiments, the IVA platform may be linked to similar IVA platforms at other companies in the same or similar field(s) to supplement and strengthen learning activities. In some embodiments, the IVA platform may be communicatively connected to IOT and automation devices in home, industrial, and commercial settings.

Embodiments contained in the figures above may be used for other use cases related to industrial facilities and governmental agencies that operates energy, sewer, and water systems and may include other personas within the organization such as utility/facility director, operations manager, system operator, planning engineer, and field/maintenance crew or outside the organization such as outsourced third-party facilities and Operations and Maintenance (O&M) contractors. For each of these personas, there is a typical pain point that can be efficiently addressed with the help of the industrial virtual assistant. A utility/facility director may have a pain point of an inability to review up to date utility status and performance which could be solved by an IVA by providing morning updates and weekly summaries. An operations manager may have a pain point because of difficulty prioritizing immediate tasks and response to events which could be solved by an incident response provided by an IVA. An operator may lack data interoperability preventing optimal operation, solved again by an IVA that provides advanced warnings with root cause analysis. A planning engineer with limited ability to conduct analysis and gain insights for optimal system upgrades can benefit from the information discovery aspect of an IVA. A field or maintenance crew that lacks access to key information needed for maintenance operations may use an IVA for information retrieval.

Embodiments may facilitate natural user interaction with data in industrial facilities and governmental agencies operating energy, sewer, and water systems using an industrial virtual assistant with focused domain knowledge.

Embodiments may be comprised of: (a) a voice/text interface based on natural processing engine for receiving queries and instructions from a user in the industrial facilities and governmental agencies operating energy, sewer, and water domain; (b) an asset management engine that provides information on assets mentioned by the user; (c) domain expertise engine with the ability to provide the correct context awareness to the user's query; (d) a data analytics engine that can implement general purpose analytics on any data from SCADA, GIS systems, asset management systems, CMMS systems, and IoT sensors such as flow rate, level, pressure, chemical, temperature, vibration, power meters, and various databases; (e) data integration engine that allows use case driven integration of multiple data streams from multiple sources; (f) a knowledge enhancement machine learning engine that can archive conversations conducted between the user and the system and use these conversation to improve the response in future conversation.

Embodiments may receive the query and/or instructions from the user and incorporates the natural language processing to support various use cases including incident response, advanced warning on potential asset failure, asset information discovery and retrieval and periodic (daily, weekly) summary report.

Embodiments may incorporate the natural language processing engine combined with the domain expert context awareness engine to classify the correct use case and to identify the data sources needed for the response to the user.

Embodiments may integrate the relevant data sources and performs the required analytics on the data that will generate the required output as per the user query and/or instructions.

Embodiments may implement the domain expert context awareness and natural processing engines to respond back to the user with the data driven insights that will address the user query and/or instructions Embodiments may receive limitless follow up queries and/or instructions and then receives the query and/or instructions from the user and incorporates the natural language processing to support various use cases including incident response, advanced warning on potential asset failure, asset information discovery and retrieval and periodic (daily, weekly) summary report. The industrial virtual assistant system and method incorporates the natural language processing engine combined with the domain expert context awareness engine to classify the correct use case and to identify the data sources needed for the response to the user. The industrial virtual assistant system and method integrates the relevant data sources and performs the required analytics on the data that will generate the required output as per the user query and/or instructions. The industrial virtual assistant system and method implements the domain expert context awareness and natural processing engines to respond back to the user with the data driven insights that will address the user query and/or instructions Embodiments may provide summary reports with all details of a conversation, including transcript, relevant data charts, visuals such as photographs or drawings, and key insights.

Embodiments may archive the conversations with a user and uses a machine learning engine for knowledge enhancement to improve response to user in future conversations.

Embodiments may integrate enterprise-level services such as federated services to one or more users, LDAP architectures, and security architectures.

For clarity and to provide a concrete example of an application of an IVA, this application uses the example of implementation of an IVA in an oil refinery. However, the system and method described herein are not in any way limited to any particular type of facility or field of use. The IVA may be put to use in any complex system involving equipment, sensors, inventory, assets, and/or their control and/or asset management systems. Some non-limiting examples of applications to which the IVA may be put include oil refineries, manufacturing facilities, warehouse facilities, building HVAC systems, refrigeration systems, and security systems and access controls for buildings, facilities, corporations, military bases, etc.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, graph databases and the like. While various aspects may preferentially employ one or another of the various data storage subsystems available in the art (or available in the future), the invention should not be construed to be so limited, as any data storage architecture may be used according to the aspects. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

"Machine learning" as used herein is an aspect of artificial intelligence in which the computer system or component can modify its behavior or understanding without being explicitly programmed to do so. Machine learning algorithms develop models of behavior or understanding based on information fed to them as training sets and can modify those models based on new incoming information.

"Neural network" as used herein means a computational model, architecture, or system made up of a number of simple, highly interconnected processing elements which process information by their dynamic state response to external inputs and is thus able to "learn" information by recognizing patterns or trends. Neural networks, also sometimes known as "artificial neural networks" are based on our understanding of the structure and functions of biological neural networks, such as the brains of mammals. A neural network is a framework for application of machine learning algorithms.

"NLP" refers to natural language processing, which is a subset of AI tasked with enabling machines to interact using natural languages. The domain of NLP also ensures that machines can process large amounts of natural language data and derive insights and information.

"NLU" refers to natural language understanding. NLU a subtopic of NLP, the main focus of natural language understanding is to make machines interpret the natural language, derive meaning, identify context, and draw insights.

"NLI" refers to natural language interaction and refers to an overall interaction experience wherein a user may use natural language to interact with a system. According to the various embodiments herein, an NLI application such as a virtual assistant may utilize NLU functionality, and it should be appreciated that NLU is used to refer to an internal function and NLI is used herein to refer to an overall arrangement or experience.

A "language recognition rule" or "NLU rule" is a specific type of condition built up from language objects and used for capturing natural language expressions. For example, a language recognition rule can be used to interpret or capture the intention of a user request.

As used herein, a "language object" means an abstract representation of a logical unit of human linguistic expression that has meaning and is suitable for processing by automated systems such as virtual assistants. Language objects, in their simplest form, are represented as single words that represent a plurality of variants of a single common meaning, including inflectional variants and variants connected by synonymy. That is, generally a language object represents all variants and synonyms of the core word that represents it, and language objects may contain grammatical variants of words as well (such as verb tenses, contractions, and so forth).

Conceptual Architecture

FIG. 1 is a block diagram illustrating integration of a distributed industrial virtual assistant platform into an industrial facility. Any utility or industrial facility will typically have equipment to be operated and a control center for operating the equipment. In smaller facilities, these may be co-located, but in larger facilities (e.g., utilities) the equipment may be located remotely from the control center(s). A typical utility or industrial facility will have an operations center 110 from which the equipment 140 is controlled. For example, in an oil refinery, the operations center 110 is typically a separate building located on the site of the refinery. Facilities operations staff (facilities manager, process control engineers, etc.) monitor and control the complex array of equipment 140 that refines the crude oil into various petroleum products. The operations center 110 will have a number of computer workstations 160 through which equipment and processes may be monitored, and other computer equipment 170 such as servers, networking equipment, etc., to which the workstations 160 are connected. Larger operations centers will have conference rooms and other special-purpose rooms 180 which may have telephones, video conferencing equipment, audio-visual equipment, etc.

Smaller equipment 140 (e.g., valves, small pumps, etc.) will be typically operated directly, while larger, more complex equipment may be operated via equipment control consoles 130 which may be located on the equipment or remotely. Processes involving multiple pieces of equipment 140 are controlled by process control consoles 120, which are typically located in the operation center 110 for the facility. Using process control consoles 120, complex sequences of operations can be monitored and implemented. All modern process control consoles 120 are computer-implemented, but some may contain displays and controls in purpose-built panels or devices. In larger facilities and for larger processes, the process control consoles are typically software-based and operated through workstations 160 that are remote from the equipment 140. The facility and/or its operational staff may also have mobile devices such as smart phones and tablet computers that allow for staff communications and/or act as process control consoles 120 or equipment control consoles 130.

Sensors 150 may be located throughout the facility, including on-board sensors on equipment 140, sensors in equipment control consoles 130, and sensors unattached to specific equipment (e.g., ambient temperature sensors).

The core of operational control of modern industrial facilities are supervisory control and data acquisition (SCADA) systems. SCADA systems comprise programmable logic controllers (PLCs) and remote terminal units (RTUs) which are microcomputers that are connected with the equipment 140 and sensors 150 throughout the facility. Depending on their configuration, the PLCs and RTUs acquire data from equipment, control equipment, or both. The PLCs and RTUs are connected to SCADA software that allows for monitoring of, and control of, the equipment, allowing for sophisticated, computer-controlled processes to be implemented on the equipment.

The distributed Industrial Virtual Assistant (IVA) platform (sometimes called "IVA platform" herein) 200 is a software layer on top of the SCADA system (or integrated into it) which provide AI-based querying and control of the SCADA system and its associated processes and equipment. Thus, as shown by the dotted lines in the diagram, the distributed Industrial Virtual Assistant (IVA) platform is connected via the SCADA system to all of the components of the facility 110-180 and is capable of obtaining and analyzing information from all such components and, depending on configuration, controlling the processes and equipment of the facility.

Figure 2:
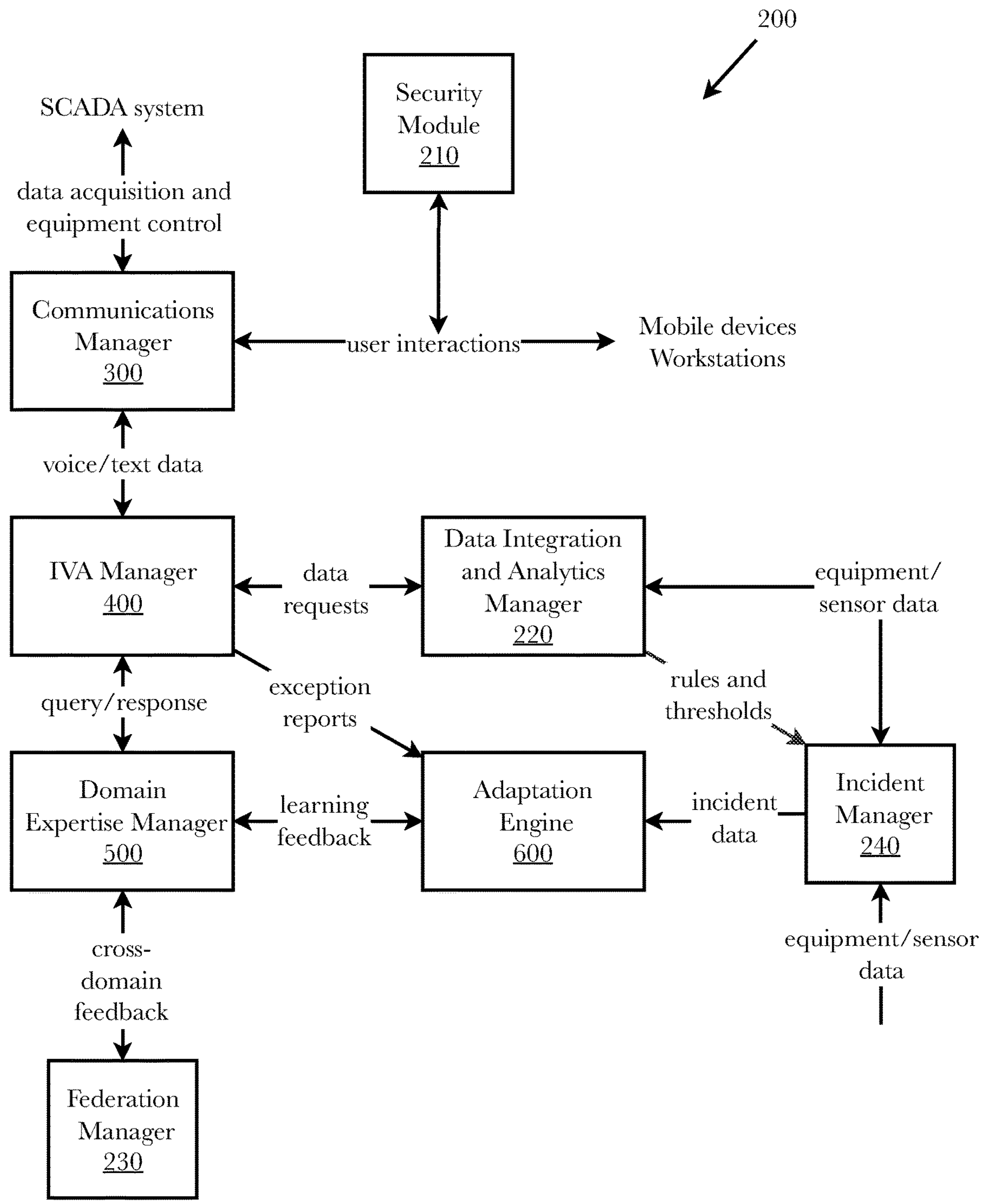
FIG. 2 is a block diagram illustrating an exemplary system architecture for a distributed industrial virtual assistant platform.

FIG. 2 is a block diagram illustrating an exemplary system architecture 200 for a distributed industrial virtual assistant platform. The system architecture of this embodiment comprises a communications manager 300, an IVA manager 400, a domain expertise manager 500, an adaptation engine 600, a data integration and analytics manager 220, a security module 210, an incident manager 240, and a federation manager 230.

The communications manager 300 is responsible for data transfer between the IVA platform and the facility's SCADA system and for facilitating user interactions via mobile devices and workstations. The IVA manager 400 is responsible for generating and instantiating device-specific and user-specific industrial virtual assistant instances based on user profiles and domain expertise, and for storing and migrating IVA instances across users, devices, and workstations.

The domain expertise manager 500 is responsible for managing domain-specific knowledge and facilities asset information, providing such knowledge and information in response to queries, and for coordinating feedback about such knowledge and information with the adaptation engine. The adaptation engine 600 is responsible for evaluating new knowledge and information and for coordinating changes to the domain-specific knowledge and facilities asset information with the domain expertise manager. These components will each be described in further detail in separate sections below.

The security module 210 is responsible for maintaining security of information passed to workstations and, in particular, to mobile devices. The security module ensures encryption of communications with user devices to prevent unintentional disclosure of sensitive information and to prevent unauthorized access to systems. In some configurations, the security module 210 may establish virtual private networks (VPNs) to user devices or use other forms of secure communications.

The incident manager 240 is responsible for receiving rules and thresholds from the data integration and analytics manager, monitoring of equipment and sensor data, and notifying of incidents involving rule adherence or violation. The federation manager 230 is responsible for management of the various databases of the platform (i.e., the domain-specific knowledge databases 520, user profile and device databases 440, IVA instance databases 450, etc.) as a distributed database management system accessible by other components of the platform. A federated database system is more scalable than non-federated database system, and can be used to support virtualization such as containerization of the IVA instances generated by the IVA manager 400.

Figure 3:
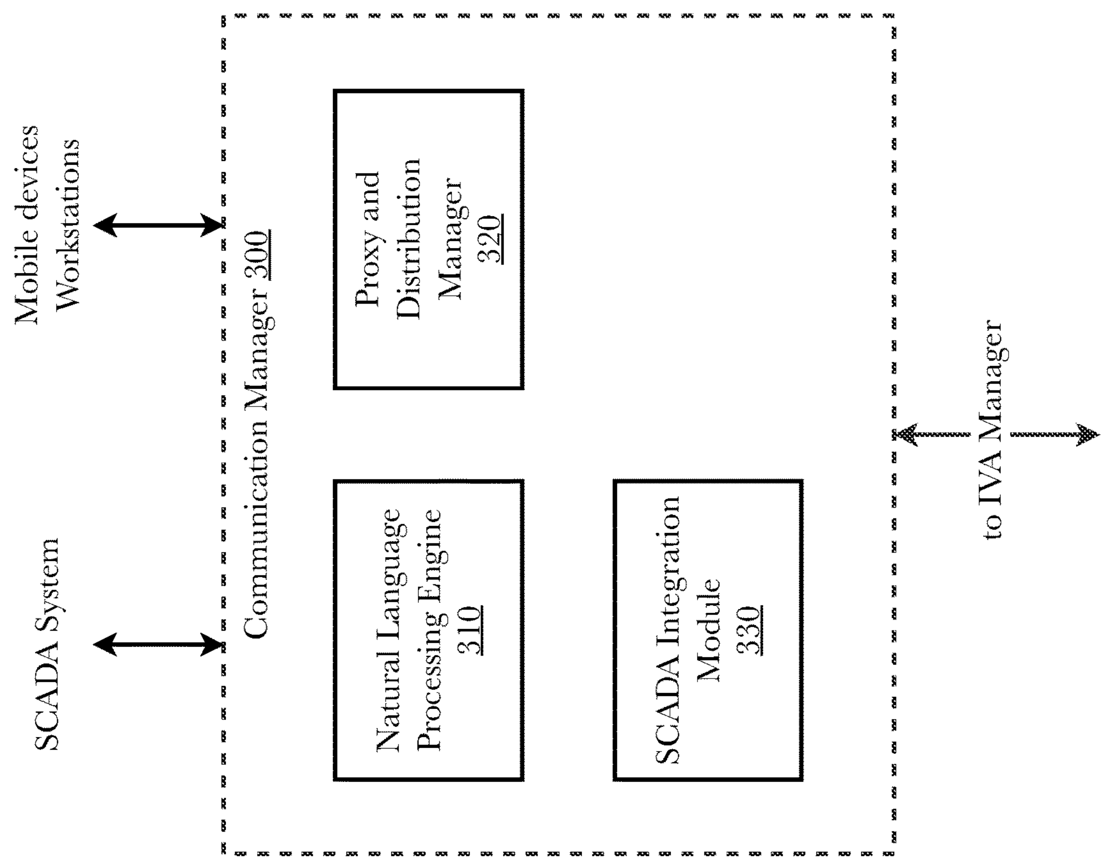
FIG. 3 is a block diagram illustrating an exemplary architecture for the communication manager aspect of the exemplary a distributed industrial virtual assistant platform.

FIG. 3 is a block diagram illustrating an exemplary architecture for the communication manager aspect of the exemplary a distributed industrial virtual assistant platform. The communications manager 300 is responsible for data transfer between the IVA platform and the facility's SCADA system and for facilitating user interactions via mobile devices and workstations. The communications manager 300 comprises a natural language processing engine 310, a proxy and distribution manager 320 and a SCADA integration module 330.

The natural language processing (NLP) engine 310 receives user communications in the form of voice and/or text. The NLP engine 310 uses speech recognition algorithms to convert any voice communications to text, and then uses domain-specific NLP machine learning algorithms to parse the text to understand the context of the communication (e.g. query for information, a control or configuration command, etc.) and to identify the assets, equipment, or resources to which the communication is directed (e.g., pump X, valve Y, etc.). The domain-specific NLP machine learning algorithms of the NLP engine 310 are trained using sample user communications in conjunction with the domain-specific knowledge database(s) 520 and facilities database(s) 540.

The proxy and distribution manager 320 is responsible for establishing and maintaining communications with users via mobile devices and workstations. The SCADA integration module is configured to receive and transmit data and control commands between the facility's SCADA system and the IVA platform 200.

Figure 4:
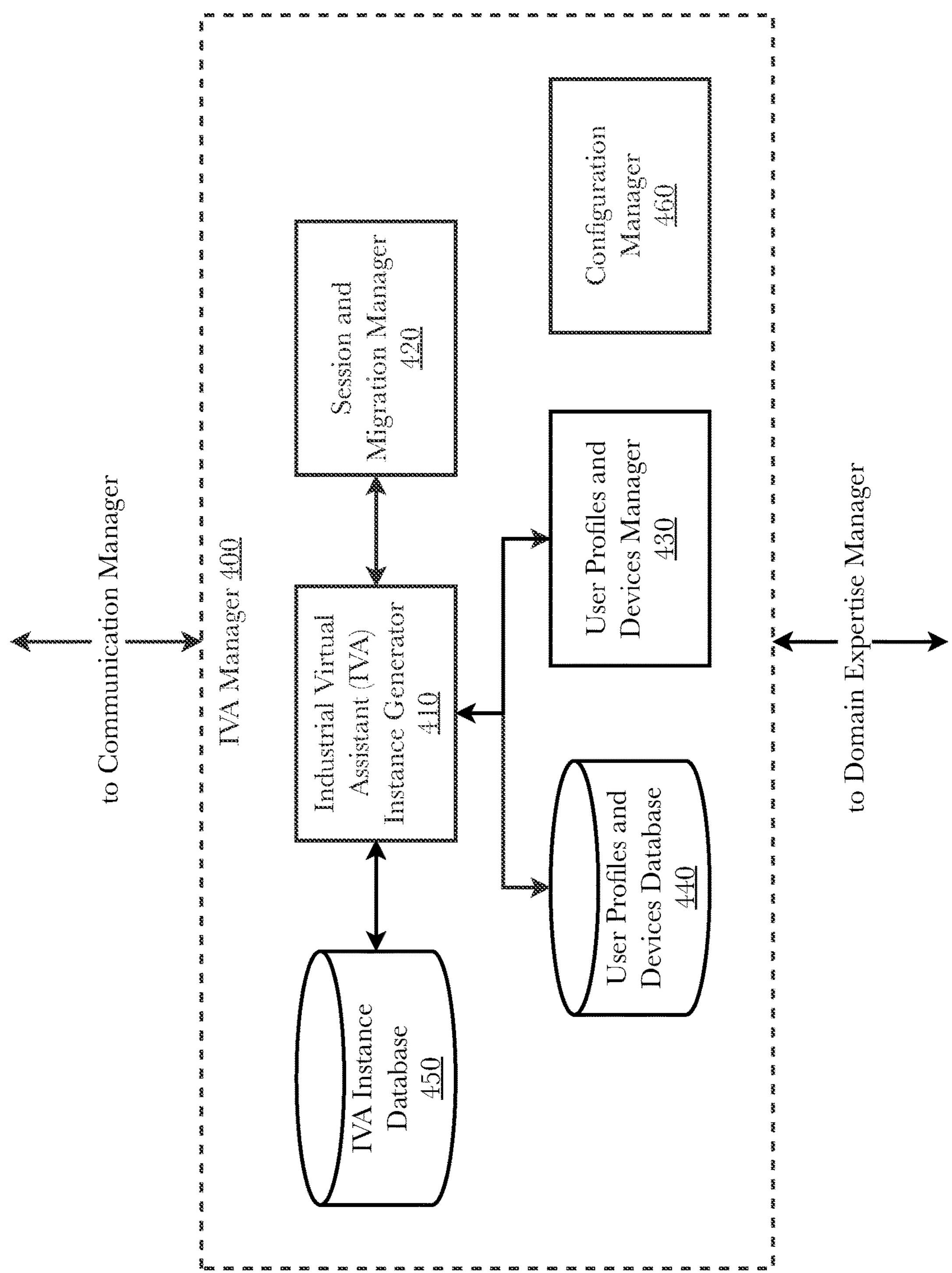
FIG. 4 is a block diagram illustrating an exemplary architecture for the IVA manager aspect of the exemplary a distributed industrial virtual assistant platform.

FIG. 4 is a block diagram illustrating an exemplary architecture for the IVA manager aspect of the exemplary a distributed industrial virtual assistant platform. The IVA manager 400 is responsible for generating and instantiating device-specific and user-specific industrial virtual assistant instances based on user profiles and domain expertise, and for storing and migrating IVA instances across users, devices, and workstations. The IVA manager 400 comprises an IVA instance generator 410, an IVA instance database 450, a user profiles and devices database 440, a user profiles and devices manager 430, a session and migration manager 420, and a configuration manager 460.

The IVA instance generator 410 generates user-specific, device-specific, and domain-specific instances of an IVA for specific users, groups, or devices by selecting domain-specific knowledge database that corresponds to information in the user profiles and devices database 440. For example, an electrical engineer working at a facility is not likely to be interested in fluid controls domain knowledge such as flow rates and pump pressures at the facility, so the information selected for the IVA instance for that engineer can be limited to the domain of electrical engineering (i.e., currents, voltages, wiring and connections, control systems such as proportional-integral-derivative (PID) controller, etc.). Further, this engineer may use only two devices at the facility, a smartphone and a workstation, which information will be contained in the user profiles and devices database 440, and may be used to install a smaller version (e.g., with fewer domains of knowledge or limited capabilities) in the smartphone, with a larger version installed on the engineer's more powerful desktop workstation. Thus, the IVA instance generator can generate IVA instances for each user that are customized to that user's role at the facility and that user's devices.

The IVA instance database 450 is used to store and manage the various instances of IVAs created for the operational staff at the facility. The session and migration manager 420 keeps track of which IVAs are active for which users at a given time, and can migrate an IVA instance to different devices, users, or groups, as necessary to maintain continuity. For example, in the case of the electrical engineer discussed above, if the engineer is working onsite with equipment located at a remote location and accesses the IVA instance on his smartphone, when he or she gets back to the office and starts working on his or her workstation, the interactions with the smartphone's IVA instance are migrated to the IVA instance on the engineer's workstation to maintain continuity of operations.

The user profiles and devices database 440 stores information about operational staff at the facility relevant to generation and use of IVAs such as the user's name, occupation, operational role at the facility, office location, access privileges and authorities, assigned computers and other devices, relevant knowledge domains (e.g., piping, electrical, construction, process controls, etc.). The user profiles and devices manager 430 can be used by administrative staff to update and manage the information contained in the user profiles and devices database.

The configuration manager 460 can be used by appropriate operational staff to select which information contained in the user profiles and devices database 440 should be used by the IVA manager 400 to generate IVA instances for a given user. In the case of the electrical engineer mentioned above, the configuration manager 460 can be used to manually force inclusion of the fluid control domain knowledge that would otherwise be excluded by the IVA instance generator's 410 automated IVA instance generation for that engineer.

Figure 5:
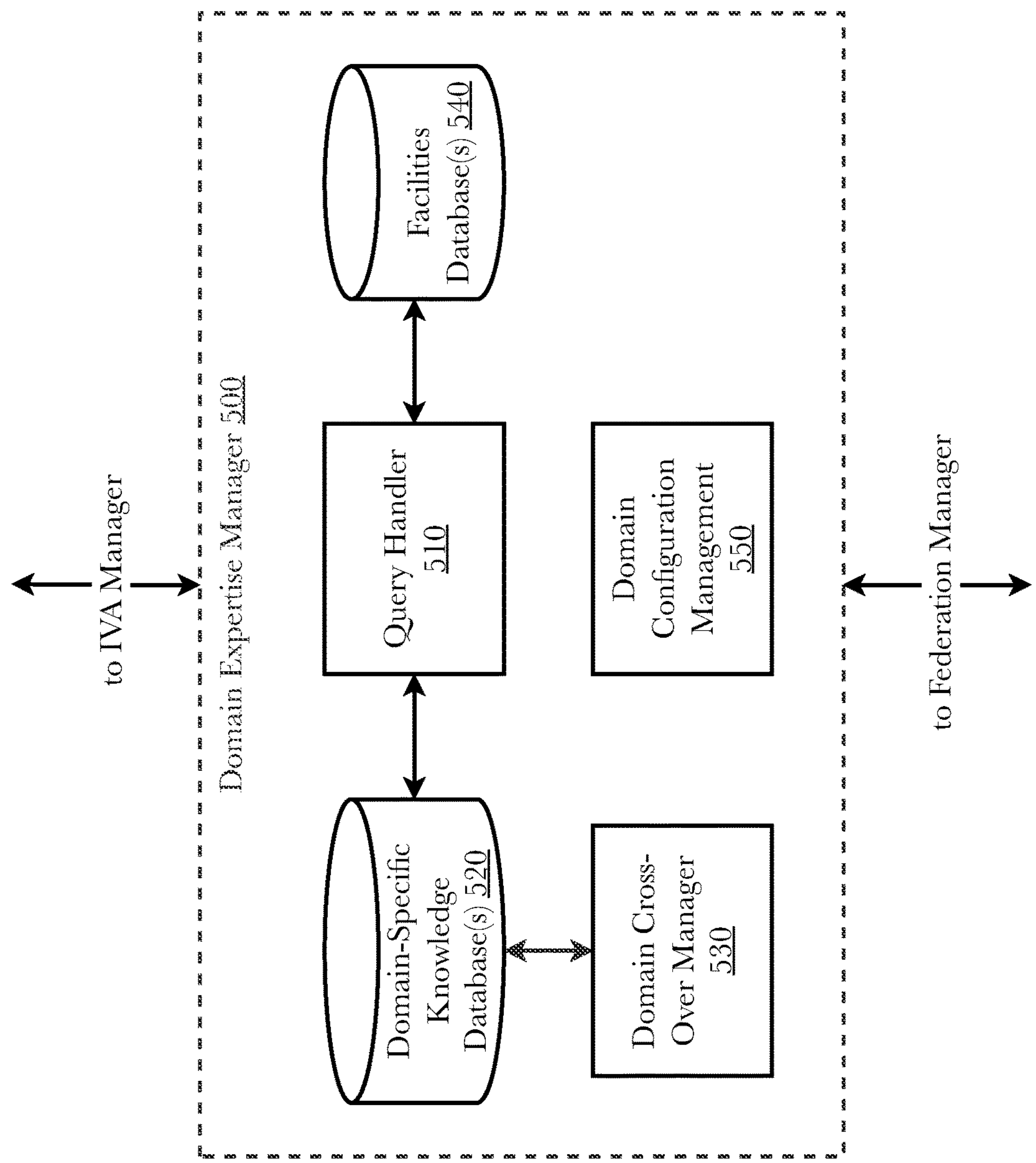
FIG. 5 is a block diagram illustrating an exemplary architecture for the domain expertise manager aspect of the exemplary a distributed industrial virtual assistant platform.

FIG. 5 is a block diagram illustrating an exemplary architecture for the domain expertise manager aspect of the exemplary a distributed industrial virtual assistant platform. The domain expertise manager 500 is responsible for managing domain-specific knowledge and facilities asset information, providing such knowledge and information in response to queries, and for coordinating feedback about such knowledge and information with the adaptation engine. The domain expertise manager 500 comprises a query handler 510, a domain-specific knowledge database 520, a facilities database 540, a domain cross-over manager 530, and a domain configuration manager 550.

The query handler 510 receives queries from the IVA manager 400 for domain-specific or facility-specific information related to a query processed by the NLP engine 310, retrieves the requested information from the domain-specific knowledge database 520 or the facilities database 540, as appropriate, and returns the requested information to the IVA manager 400.

The domain-specific knowledge database 520 comprises information organized into domains of knowledge or expertise such as construction, electrical engineering, civil engineering, mechanical engineering, processes and process controls, piping, equipment, etc. Each domain contains information and rules about that domain of knowledge such as terminology, formulas, objects, relationships, interactions, and other information that experts in that field would be expected to know or be familiar with. The information and rules about each domain can be modified over time by training and re-training of machine learning algorithms using voice, text, and visual interactions with users and/or equipment over a period of time to determine which actions and behaviors govern incidents. The rules may include checking on one or multiple exceptions, existence of various conditions, simple statistical checks on various data sets and even including static meta information about the assets involved. From the information and rules, IVAs can be constructed that are domain-specific, and can be further customized to be user-specific and/or device-specific. The information and rules used to generate IVAs may change over time as the system learns from user interactions, exceptions, and incidents. The domain-specific knowledge database 520 also stores learning about complex incident behaviors (e.g., in industrial/utility processes). From these complex incident behaviors, IVAs can be generated to connect data from various systems and over time to anticipate problems and prescribe actions to users. The domain-specific knowledge database 520 can contain information and rules about vendor-specific equipment allowing companies to expertly craft interactions between an IVA instance, a given user, and relevant facility assets, equipment, or processes.

The information and rules contained in the domain-specific knowledge database 520 may be used to create and establish thresholds and/or triggers which can be used to monitor data from certain pieces of equipment or from certain processes. Thresholds and triggers may be quite complex, requiring multiple steps or multiple points of data to be met, but two simple examples are establishment of a set point or may establish a range of operation values. When a threshold or trigger is met, a notification of the occurrence of the threshold event or trigger may be sent to the user.

The facilities database 540 contains facility-specific information about equipment, components, sensors, and processes of the facility, and is configured to store current and historical data about the current status of the facility (e.g., equipment operational statuses, sensor data, flow controls, current processes in operation, etc.) such that historical data can be accessed by the IVA platform. The facilities database 540 may contain information not only about the facilities assets (e.g., tank capacities, pipe capacities and flow rates, pump pressures, etc.), but also about processes within the facility (e.g., flow rates are not allowed to exceed a certain rate during certain operations, increasing processing volumes of a given operation will reduce efficiency by a certain percentage, etc.). The facilities database 540 may be updated by continual re-training of machine learning algorithms based on exceptions and/or incidents identified during the interactions. As one example, if the facilities database 540 indicates that a particular pump should be operating at a minimum pressure of 100 psi, but an operator determines that a given process works better if the pump is operated at 90 psi, the system will learn that the preferred operation for that pump at that facility is 90 psi, not 100 psi.

The domain cross-over manager 530 identifies and coordinates information that corresponds to multiple domains.

For example, information about the nominal operating pressure of a given type of pump may be relevant to multiple related domains such as pumps, piping, process controls, mechanical engineering, and other domains. Therefore, if learning about that given type of pump occurs in one domain, domain cross-over manager 530 ensures that that learning is propagated to other related domains to ensure consistency in analysis and responses by IVAs generated for those domains.

Domain configuration manager 550 may be used by appropriate operational staff to make manual changes to the databases 520, 540 or operation of the query handler 510 or domain cross-over manager.

Figure 6:
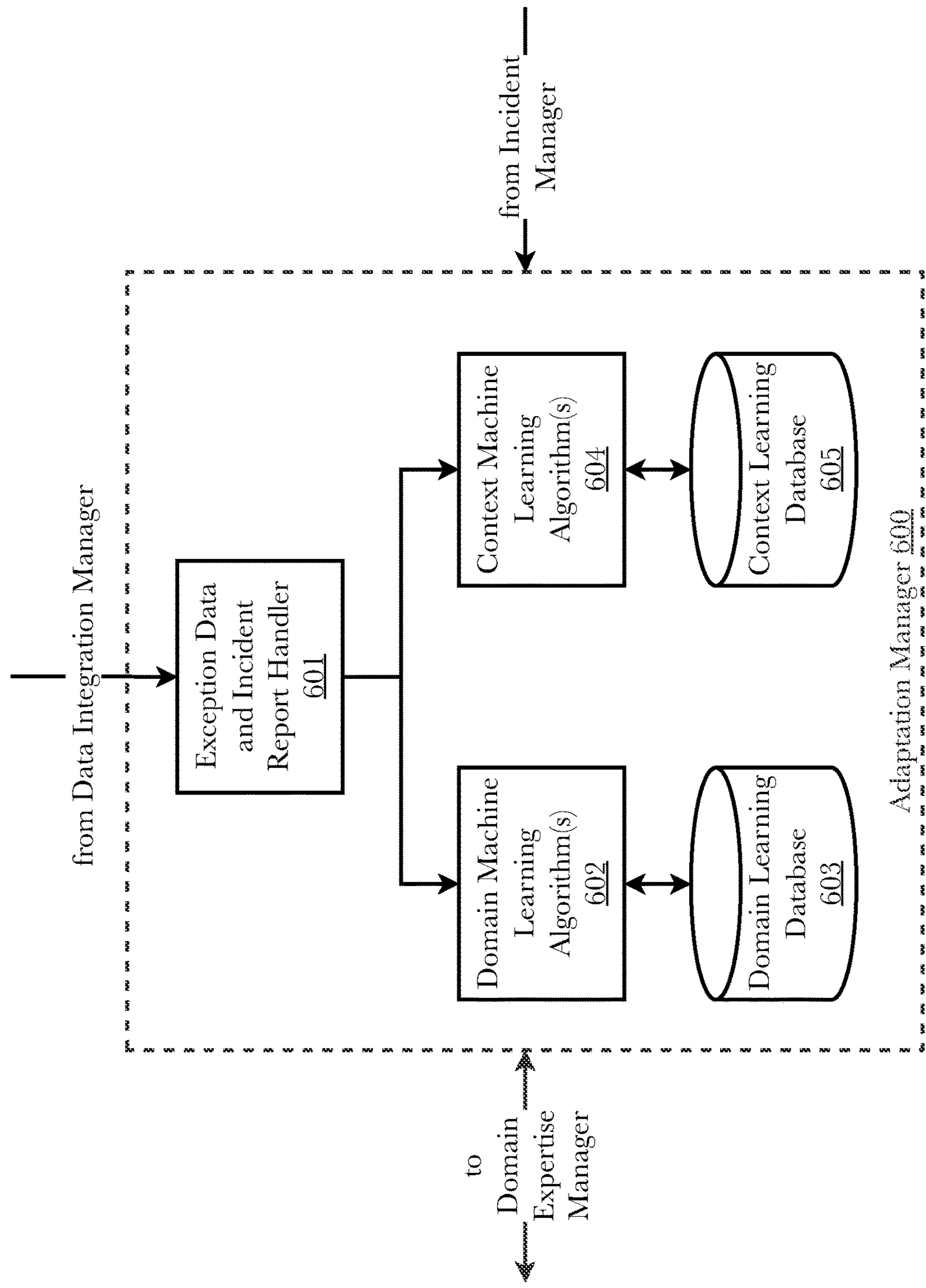
FIG. 6 is a block diagram illustrating an exemplary architecture for the adaptation manager aspect of the exemplary a distributed industrial virtual assistant platform.

FIG. 6 is a block diagram illustrating an exemplary architecture for the adaptation manager aspect of the exemplary distributed industrial virtual assistant platform. Adaptation engine 600 is responsible for evaluating new knowledge and information and for coordinating changes to the domain-specific knowledge and facilities asset information with the domain expertise manager. Adaptation manager 600 is the adaptive learning component of the platform and comprises an exception data and incident report handler 601, a domain machine learning algorithm (MLA) 602, a context machine learning algorithm (MLA) 604, a domain learning database 603, and a context learning database 605.

Exception data and incident report handler 601 receives notification of exceptions from a given IVA instance, forwards the exception to the domain MLA 602 and forward the context in which the exception occurred to the context MLA 604. As an example, an IVA instance may tell a user that the nominal (name plate) operating pressure of a given pump is 100 psi, but in response the user tells the IVA that the pump operates better at 90 psi. The user's response is an exception and the context of the response is that a certain engineer on a certain day at a certain time using a certain device (and possibly under certain circumstances such as during a certain process) said that the pump operates better at something other than the nominal pressure.

The domain machine learning algorithm (MLA) 602 receives exceptions and processes them to learn new information about the subject of the exception (in the example above, about pump operating pressures for a given pump), which information may be forwarded to the domain expertise manager for direct incorporation, and which may be generalized by the domain MLA to similar types of pumps if similar exceptions are received over time. This learning information is stored in the domain learning database 603. More information is described below about machine learning models that may be used by the IVA platform.

The context machine learning algorithm (MLA) 604 receives exceptions and processes them to learn new information about the context in which an exception occurred so as to generalize that learning to other similar contexts. For example, if the engineer makes the same exception about lowering the operating pressure of the pump to 90 psi at a particular time each day, the system can learn that the pressure for that pump should be lowered each day at that time, and can either prompt the engineer to do so, or ask the engineer if that procedure should be implemented automatically each day. Likewise, if a different engineer is working on a given day, the system can notify the different engineer that the other engineer usually lowers the pump pressure at that time each day. This learning information can be stored in the context learning database 604, and the learning outcomes as described above may be forwarded to the domain expertise manager 500 for incorporation into the domain-specific knowledge database 520. More information is described below about machine learning models that may be used by the IVA platform.

Detailed Description of Exemplary Aspects

Figure 7:
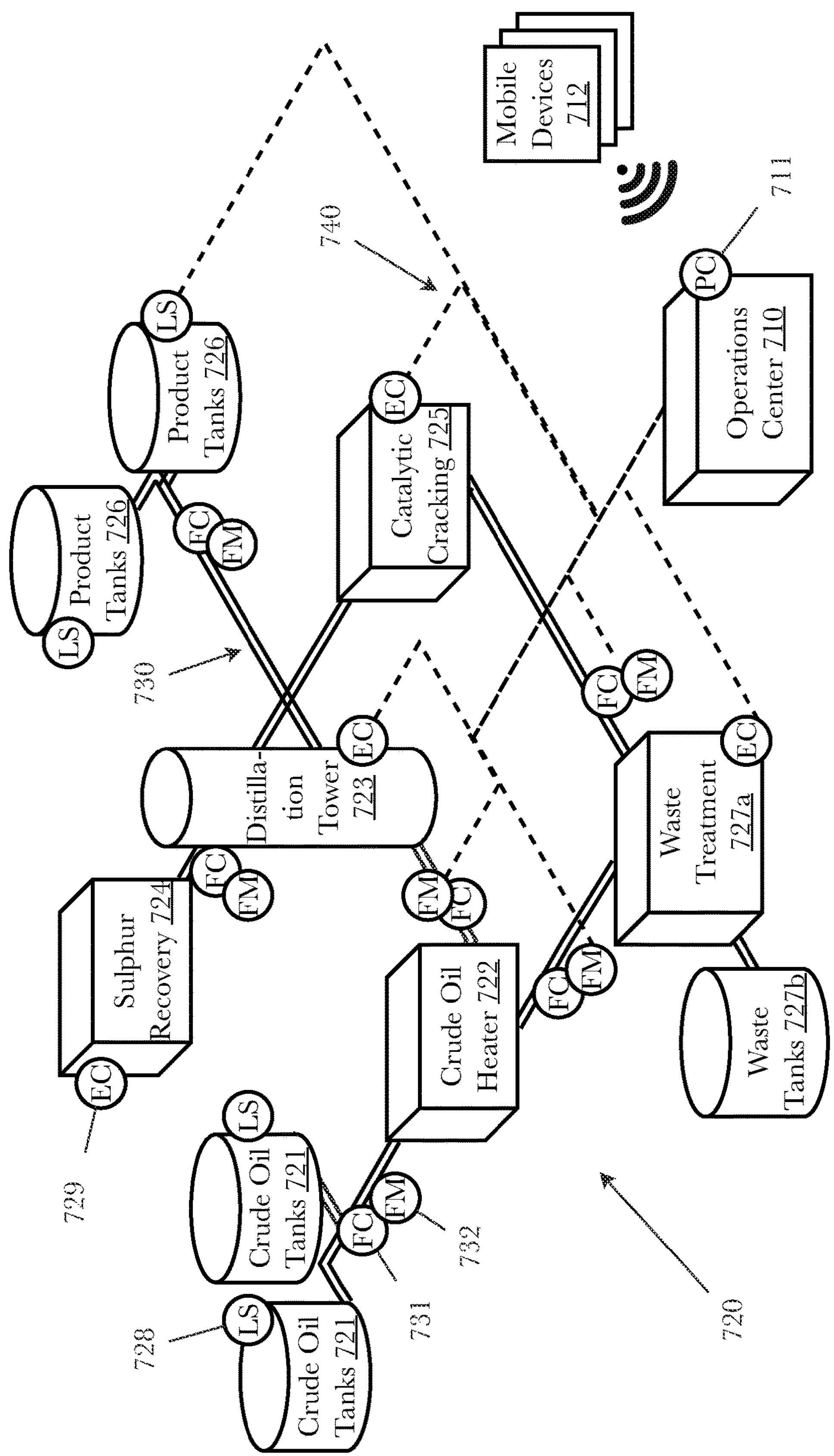
FIG. 7 is an illustration showing a simplified layout of an oil refinery as an example of an industrial facility into which a distributed industrial virtual assistant platform may be integrated.

FIG. 7 is an illustration showing a simplified layout of an oil refinery as an example of an industrial facility into which a distributed industrial virtual assistant platform may be integrated. In this example, the oil refinery comprises a refining system 720 comprising crude oil tanks 721 in which crude oil is stored before processing, a crude oil heater 722 which heats the crude oil for separation into fractions by the distillation tower 723, a distillation tower 723 in which the heated crude oil is separated into heavier and lighter fractions by drawing off and condensing the gasses from the crude oil at different heights within the tower, a catalytic cracking unit 725 which uses heat, pressure, catalysts, and sometime hydrogen to crack heavy hydrocarbon molecules into lighter ones, a sulfur recovery processor 724 which removes hydrogen sulfide from the products and converts them into non-toxic elemental sulfur, a waste treatment unit 727*a* and waste tanks 727*b* which receive wastewater and allow solids and contaminants to settle out, product tanks 726 which store the refined petroleum products. The entire process is controlled from operations center 710 staffed by engineers and other knowledgeable professionals. This diagram shows the piping network 730 between each of the units of the refining system 720 with flow controllers 731 and flow meters 732 along each of the pipes, level sensors 728 on the tanks 721, 726, equipment controllers 729 associated with each processing unit, and a process controller 711 located at the operations center 711, along with a wiring network 740 connecting each flow controller, flow meter, equipment controller, and level sensor to the operations center 710. The wiring network plus its connections constitutes the hardware of the refinery's SCADA system, all managed by software at the operations center 710. Operations staff may use workstations at the operations center 710, or may use mobile devices 712 for system control while outside of the operations center 710. Note that this process is necessarily simplified for clarity and shows exemplary connections rather than all possible connections.

The IVA platform 200 is a software layer on top of the SCADA system (or integrated into it) which provide AI-based querying and control of the SCADA system and its associated processes and equipment. Thus, the IVA platform 200 is connected via the SCADA system to all of the components of the refining system 720 and is capable of obtaining and analyzing information from all such components and, depending on configuration, controlling the processes and equipment of the facility.

Figure 8:
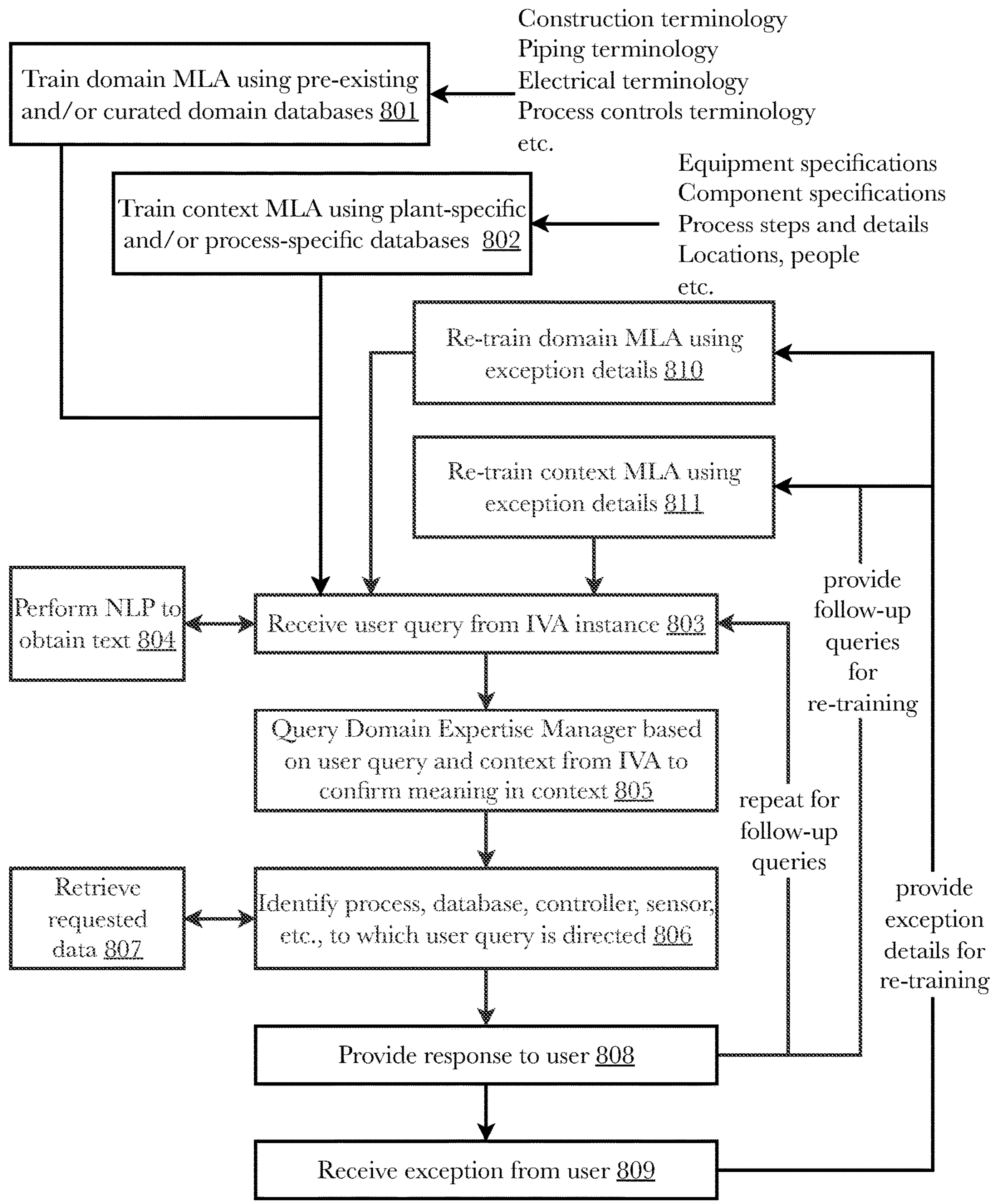
FIG. 8 is a method diagram illustrating an exemplary process for re-training of domain and context machine learning algorithms based on user interactions.

FIG. 8 is a method diagram illustrating an exemplary process for re-training of domain and context machine learning algorithms based on user interactions. Initially, a domain machine learning algorithm (MLA) is trained using pre-existing and/or curated domain databases 801 which contain domain expertise knowledge such as construction industry terminology, piping terminology, electrical terminology, process controls terminology, and rules and other expert knowledge relevant to each such domain. Likewise, a context MLA is trained using facility-specific and/or process-specific databases 802 containing information such as equipment specifications, component specifications, process steps and details, locations, people, etc. When a user query is received by an IVA instance 803 the IVA performs natural language processing to convert any voice communications to text, and to parse the text of the communication into words and phrases 804. The parsed text is used to query the domain expertise manager to confirm the meaning of the words and phrases in context 805 and them to identify equipment, processes, components, sensors, of the facility to which the user query is directed 806. Data is retrieved for the identified items 807, and a response to the query is provided to the user 808. This process is repeated for any follow-up queries the user may have for additional information or more specific information, and the follow-up queries are forwarded to the context MLA for re-training based on the context of the follow-up queries (e.g., if the user asked for "today's" pump pressure for pump X and got the current pressure, he or she may follow up to ask about the average pressure for the day, which context will be incorporated by the context MLA to better handle future such requests). In the event that the user provides an exception to the response 809 (e.g., "the pump pressure for that pump should be 90 psi, not 100 psi"), the exception details are provided to the domain MLA for re-training based on the new information 810 and the context for the exception is provided to the context MLA for retraining 811 (e.g., this user on this day at this time requested a lower pump pressure for this pump).

Figure 9A:
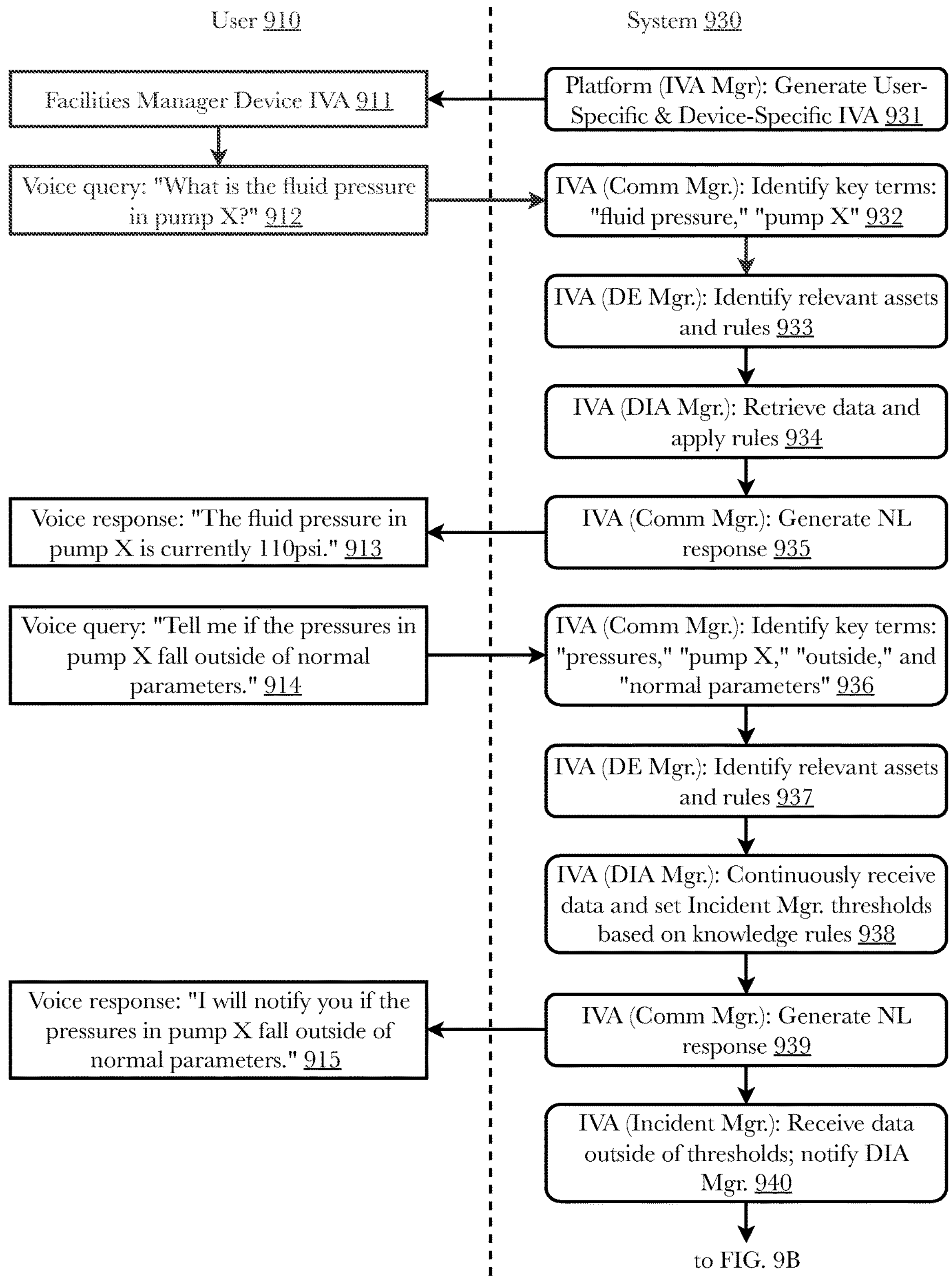
FIGS. 9A & 9B are flow diagrams illustrating an exemplary operational use of a distributed industrial virtual assistant platform to assist in the operation of an industrial facility.
Figure 9B:
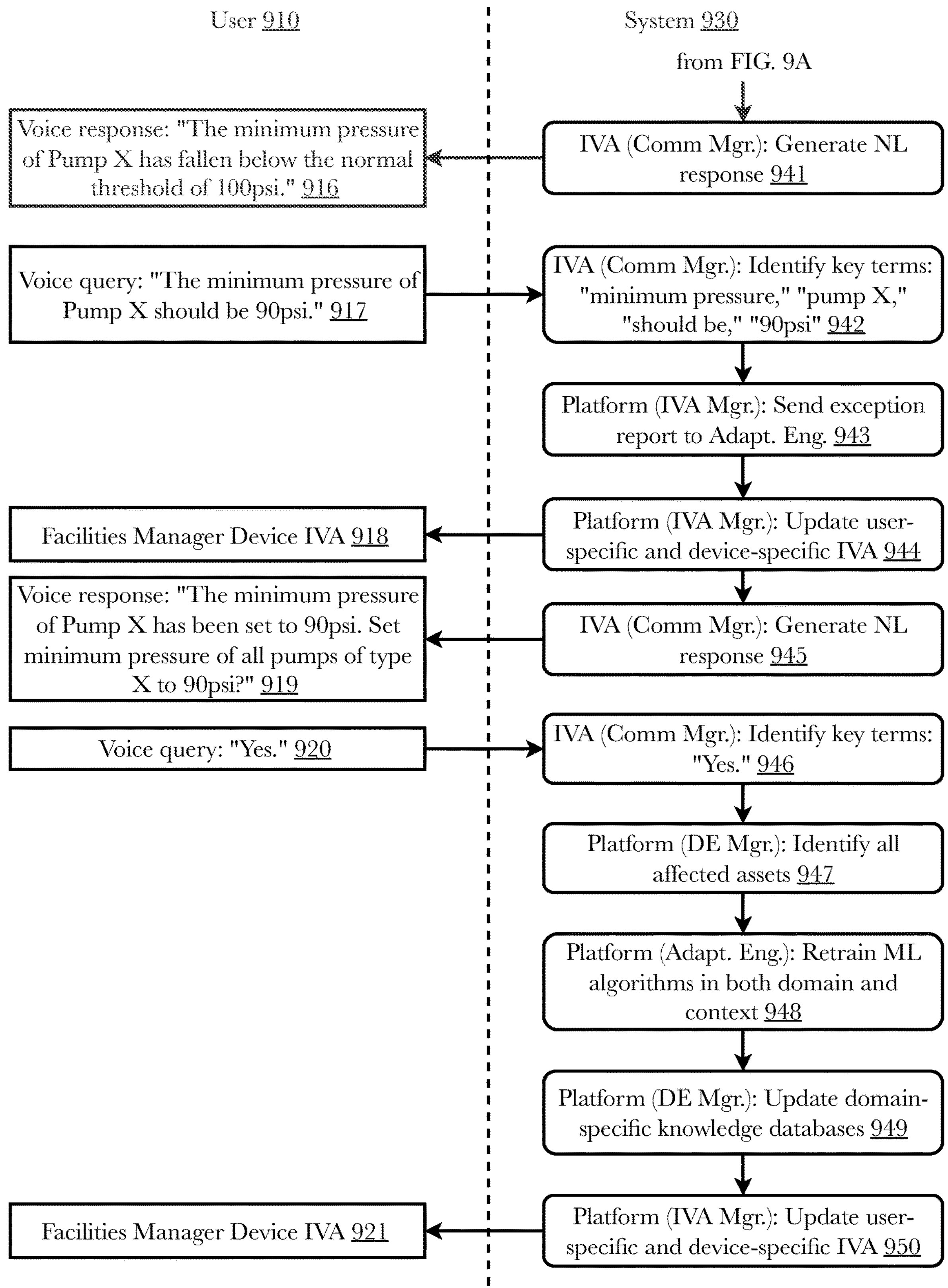

FIGS. 9A & 9B are flow diagrams illustrating an exemplary operational use of a distributed industrial virtual assistant platform to assist in the operation of an industrial facility. Here, messaging is shown between a user 910 and the system 930, along sequences of operations occurring either at the IVA instance or the IVA platform.

The IVA manager of the IVA platform generates a user-specific and device-specific IVA 931 for the facilities manager (user) of a facility and uploads the generated IVA instance to the facilities manager's device 911. Using the IVA, the user asks for the fluid pressure in pump X 912. This query is received by the communications manager of the IVA 932 which performs speech-to-text conversion and identifies the key terms "fluid pressure" and "pump X" using its natural language processor. The parsed text is sent to the domain expert manager to identify relevant facility assets, processes, and rules 933. The data integration and analysis manager retrieves the requested data and/or applies the appropriate rules 934 and sends the data to the communications manager for generation of a response using its NLP engine 935. The user receives the response "the fluid pressure in pump X is currently 110 psi" 913, to which the user replies with a follow-up query "tell me if the pressures in pump X fall outside of normal parameters" 914. The same process of parsing the query and identifying assets as above is performed 936, 937, but note that the term "normal parameters" must be determined by the domain expertise manager from the domain-specific knowledge database. Once the normal parameters of that pump are determined, thresholds can be set and sent to the data integration and analysis manager for monitoring 938, and a natural language response is generated 939 confirming that the IVA will notify the user if the pressures in pump X fall outside normal parameters 915. Upon triggering of a rule or threshold at the data integration and analysis manager, another natural language response is generated 941 stating that the minimum pressure of pump X has fallen below the normal threshold of 100 psi 916, to which the user responds by stating the exception "the minimum pressure of Pump X should be 90 psi" 917. The same process of parsing the query as above is performed 942, but this time an exception is noted and an exception report is sent to the adaptation engine 943. The platform IVA manager updates the user-specific and device-specific IVA to reflect the new information in the exception 944 and the updates are uploaded to the facilities manager device IVA 918, along with a natural language generated response 945 confirming that the minimum pressure threshold for Pump X has been set to 90 psi, and asking whether this new rule should be applied to all pumps of type X 919. A positive response by the user 920 and natural language recognition by the IVA communications manager 946 sets in motion an update process which identifies all affected assets 947, retrains the machine learning algorithms in using both the new domain information (90 psi for pumps of type X instead of 100 psi) and the new context information (from the facilities manager using a particular device at a particular time on a particular day, etc.) 948, updates the domain-specific knowledge databases based on the retraining 949, and finally updates the user-specific and device-specific IVA 950 and uploads it to the facility manager's device 921.

Figure 10:
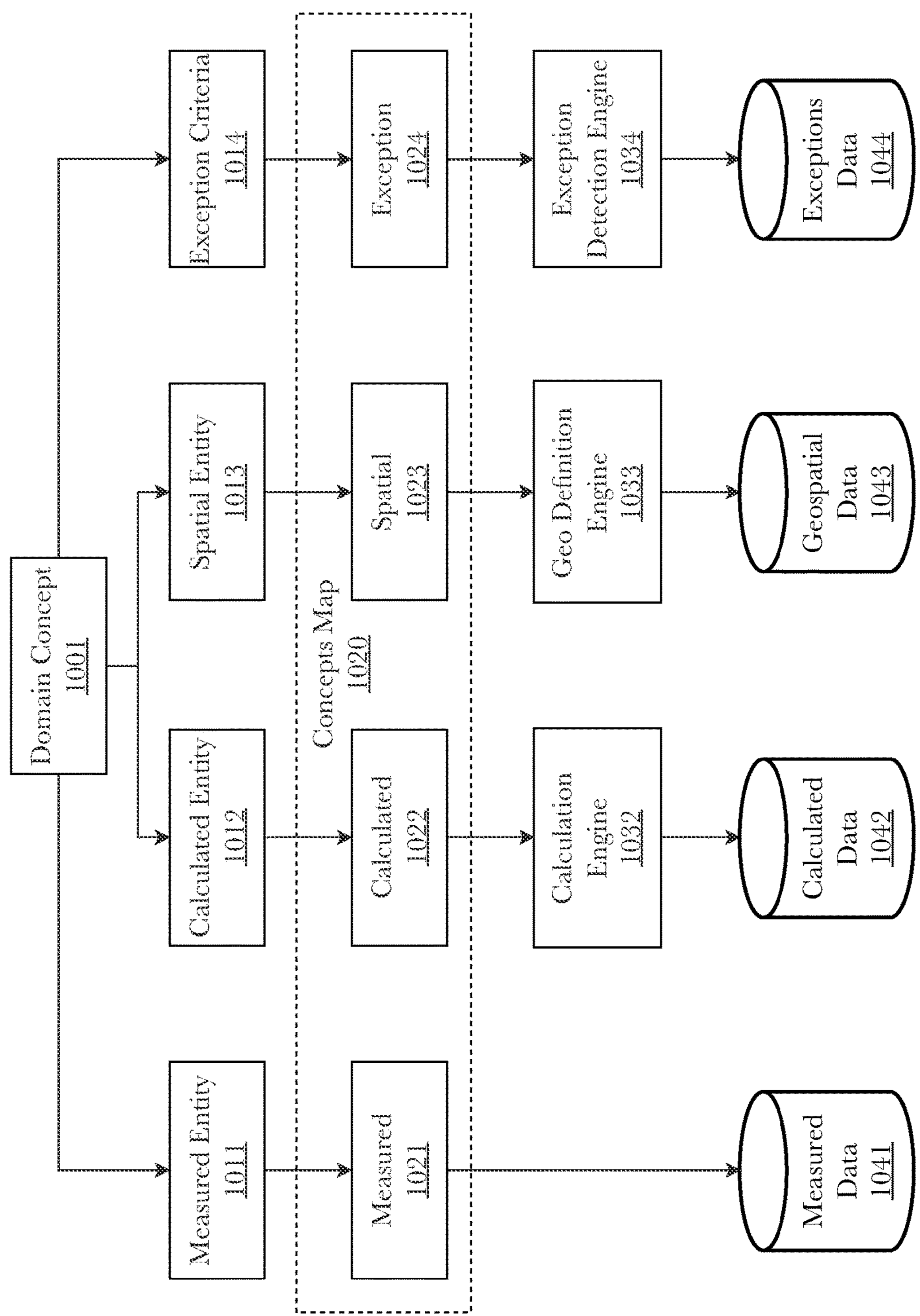
FIG. 10 is a block diagram illustrating an exemplary conceptual mapping architecture for a dynamic concept learning system.

FIG. 10 is a block diagram illustrating an exemplary conceptual mapping architecture for dynamic concept learning. This flow diagram shows an exemplary method for training an industrial virtual assistant. A user interface is provided that allows for users to provide textual listing of domain concepts 1001. A domain concept 1001 may be classified into various entities such as: measured entities 1011, calculated entities 1012, spatial entities 1013, and exception criteria 1014.

From these entities, a concept map 1020 may be developed wherein a links measured entities 1011 with corresponding measured concepts 1021. Measured data may be stored in a measured data database 1041. User may use a visual interface or voice commands to establish this linking.

The user may define a time-series processing-based criteria 1012 and link it with a calculated concept 1022, using a visual interface or voice commands to provide the criteria definition.

The user may link elements on a GIS map (individual or a spatially grouped) 1013 with spatial concepts 1023 previously defined, using a visual interface or voice commands to establish this linking.

The user may define an exception concept 1014 whereby the exception criteria 1024 provided by the user can be executed on a measured concept 1021 or a calculated concept 1022, using a visual interface or voice commands to provide the criteria definition.

A natural language processing engine—which may also comprise natural language understanding (NLU)—may be used to extract the "intent" and "entity" from user's speech/text describing a calculated concept 1022 and its definition. For example: a user provides a definition of a calculated concept 1022, as speech or text or via a visual user interface, for a concept called "Nightline": which may be defined as Min Night Flow on All Flow Sensors. Then a user provides the following definition of an exception concept 1024, as speech or text or via a visual user interface, for a concept called "Critical Nightline": Critical Nightline if Nightline is on an uptrend. Lastly, a user provides the following definition of a spatial concept 1023, as speech or text or via a visual user interface, for a concept called "Eastern Zone": All sensors located within this polygon are part of Eastern Zone. These are passed to the NLP engine to extract the intent and entities. From example above, Intent: Min Night Flow and Entities: All, Flow Sensors.

Intents may be mapped to generic or domain specific calculation libraries, generic or domain specific geographic definitions, generic or domain specific exception definitions, or any combination thereof.

Supported generic or domain specific calculation libraries comprise general calculations which include but are not limited to maximum, minimum, average, daily/nightly minimum, daily/nightly maximum, daily/nightly average, rate of change, delta, uptrend, downtrend, trend. Examples of domain specific calculations include but are not limited to (water domain in this case): Min Night, Daily Consumption, Demand Metered Area (DMA) InFlow, Water Balance etc.

Supported generic or domain specific geographic definitions comprise general geographic definitions which include but are not limited to part of (polygon, circle, square), at (location (defined by a point on a geographic map e.g., latitude/longitude)), group of locations, postcode. Examples of domain specific geographic definitions include but are not limited to (water domain in this case): District Metered Area (DMA), Demand Zone (DZ), Network Supported generic or domain specific exception definitions comprise general exception definitions include but are not limited to less/greater than, is equal, is uptrend, is downtrend, rate of change equal or greater/less than, no data, no change in data. Examples of domain specific Exception definitions include but are not limited to (water domain in this case): Noisy Flow, Bad Acoustic, No Solar Charging Entities may be mapped to measured concepts 1021 or other calculated concepts 1008 to determine target of the intent, and then registered as a new concept in the concepts map 131.

For each registered concept in the concepts map 1020, algorithms executed by various engines 1032-1034 such as following are provided to satisfy the concept's intent. A calculation engine 1032 executes calculated concept intents on entities to produce a new calculation and store most recent values in a calculated data cache 1042 for quick retrieval. A geo definition engine 1033 executes spatial concept intents on entities to produce definitions of new geographical concepts and store any new geographical concept definitions in a geo database (Geo DB) 1043. An exception detection engine 1034 executes exception concept intents on entities to detect an exception and stores the most recent exceptions in an exceptions cache 1044 for quick retrieval.

Figure 11:
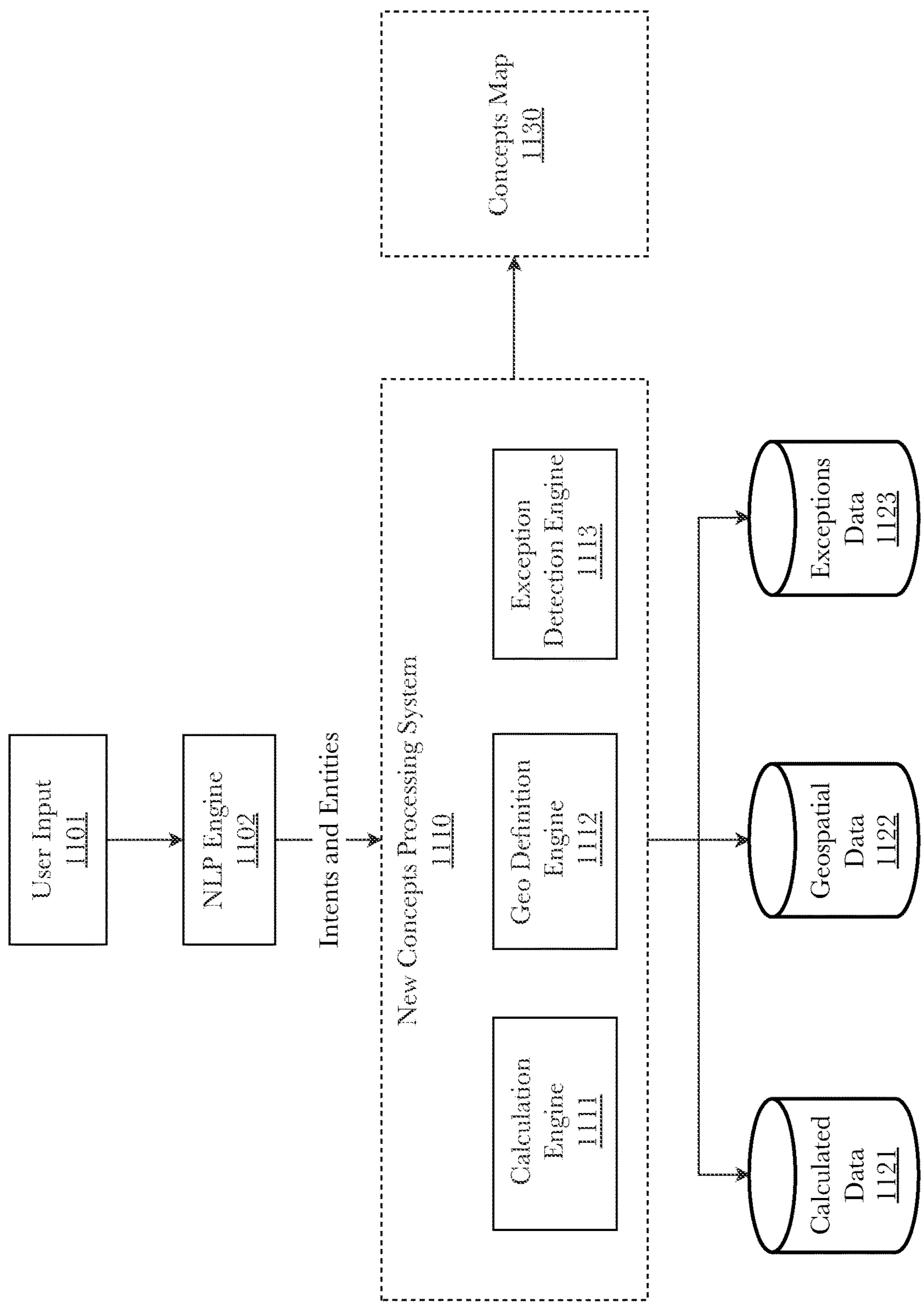
FIG. 11 is a flow diagram illustrating a dynamic concept learning process.

FIG. 11 is a flow diagram illustrating a dynamic concept learning process. Upon text or voice command from user 1101, the system uses a natural language processing engine 1102 to parse the query to identify the intent and entities in the user's query. For newly identified concepts and entities, the parsed query is sent to a new concept processing system 1110 comprising a calculation engine 1111, a geographical definition engine 1112, and an exception detection engine 1113. The calculation engine 1111 executes calculates the concept "intent on entities" to produce a new calculation applying the identified intent to the identified entities in the parsed query, and store most recent values in a calculated data cache 1121 for quick retrieval. The geographical definition engine 1112 produces a corresponding geospatial definition of "intent on entities" and stores the geographical concept definition in geospatial cache 1122. The exception detector 1113 analyzes the calculated "intent on entities" for correspondence with an existing concepts map 1130 and generates an exception if that calculated "intent on entities" is not already contained in the concepts map 1123 or conflicts with data already in the concepts map 1130. Generated exceptions are stored in an exceptions cache 1123 for quick retrieval.

Figure 12:
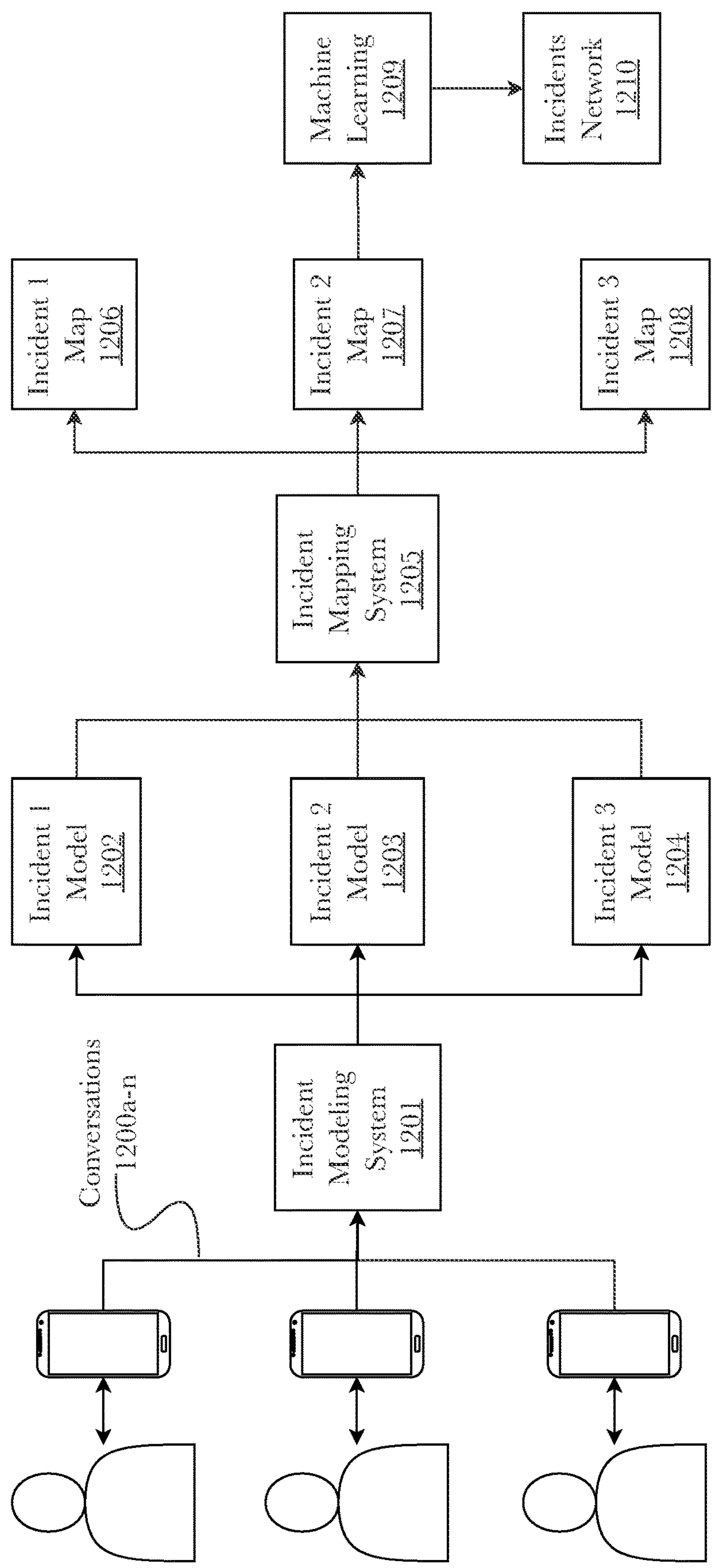
FIG. 12 is a flow diagram illustrating the workflow from a plurality of conversations to a generation of an incidents network.

FIG. 12 is a flow diagram illustrating the workflow from a plurality of conversations 1200*a-n* to a generation of an incidents network. A voice and text based Industrial Virtual Assistant (IVA) may be trained using voice, text, and visual interactions over a period of time on various rules that govern incident detection criterion. The rules may include checking on one or multiple exceptions, existence of various conditions, simple statistical checks on various data sets and even including static meta information about the assets involved.

For each incident type, the IVA may be provided different sets of rules over time. In the backend, the IVA dynamically builds a convergence map that guides it to apply the best set of rules and make a highly accurate incident detection and classification for similar future incidents.

This dynamic learning also eliminates the laborious work by domain experts and operators of having to check various datasets and exceptions manually each time. The IVA, after selecting the best set of rules, automatically does those checks and brings actionable insights to the users, saving significant amount of time during time critical incident response scenarios.

According to another learning aspect of various embodiments, a user interface may be provided for a user to ask questions and receive responses in regard to measured data (such as data from sensing systems, asset information etc.), calculated data (data derived from sensor data e.g., maximum daily pressure derived from pressure data), spatial (data representing a geographic entity such as an area/zone) and exceptions (exceptions detected on measured and/or calculated data e.g. abnormal pressure detected on pressure data). A user may explicitly command the IVA to capture criteria definition of an incident from on-going conversation. A visual user interface may be provided allowing a user to select one or multiple parts of the on-going conversation to be included in the incident criteria. Inputs may be taken from the conversation and used to generate a structured representation of the incident criterion called incident model 1202-1204 via an incident modeling system 1201.

A data model named incident map 1206-1208 may be provided to represent various criteria rules related to different incidents and on which parts of the system (sensors, geographic locations etc.) these rules apply. The incident models 1202-1204 are ingested into an incident map 1206-1208 via an incident mapping system 1205. A machine learning method 1209 generates an incident network 1210. Supervised or unsupervised machine learning may be used. Some machine learning methods may be preferred such as an artificial neural network, deep learning network, or a decision tree network which may be used to learn from multiple criteria rules related to the same incident. Each time an incident is detected using an existing criterion or a new criterion is provided by the user, the machine learning method is employed to update the underlying machine learning model using the most up-to-date incident map.

Figure 13:
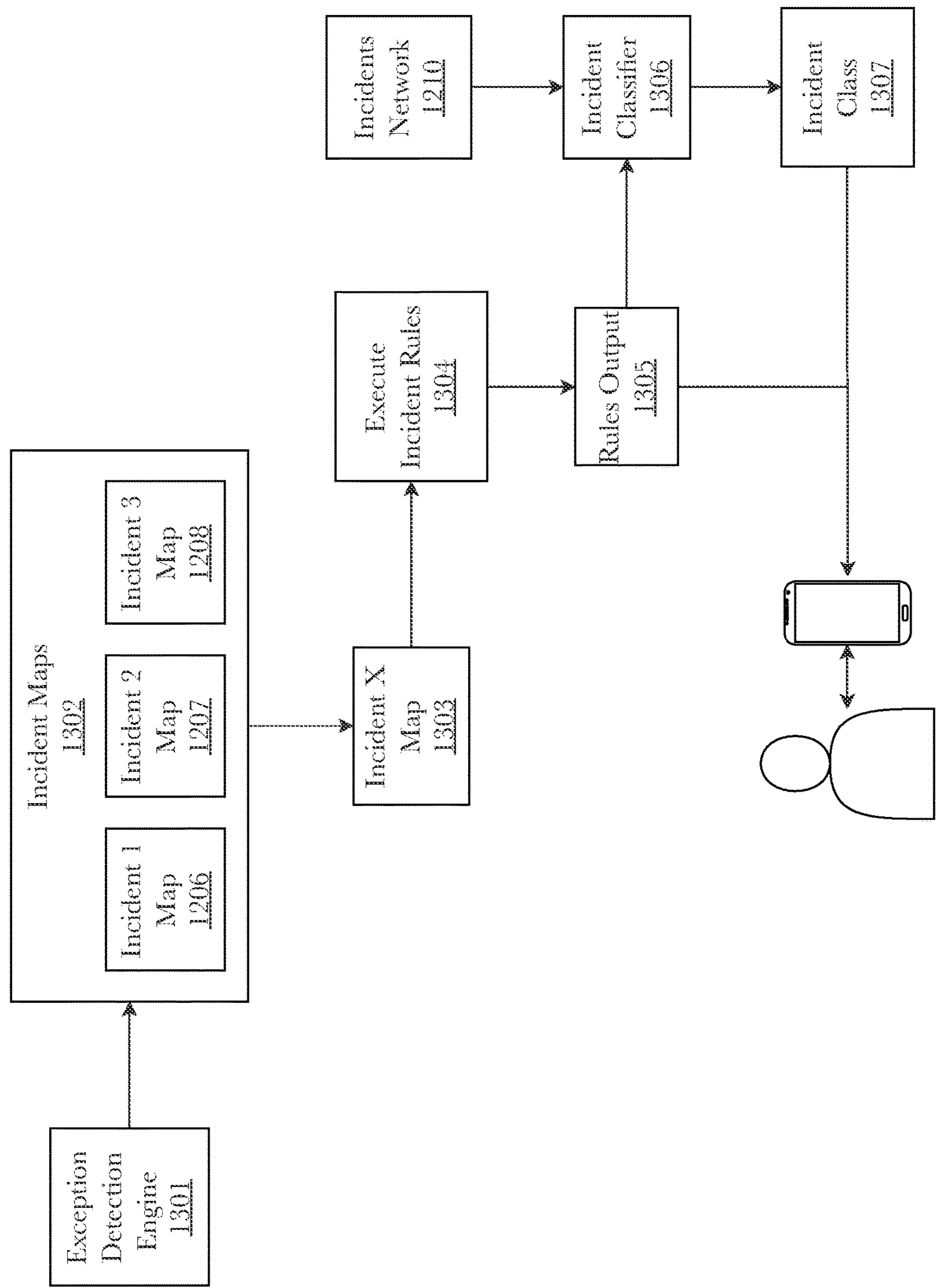
FIG. 13 is a flow diagram illustrating the workflow for using learnings from past user conversations to classify new incidents and provide a richer incident classification experience.

FIG. 13 is a flow diagram illustrating the workflow for using learnings from past user conversations to classify new incidents and provide a richer incident classification experience. An exception detection engine 1301 detects a measured and/or calculated data exception, e.g., Abnormal Pressure detected on Pressure data. Once a detection occurs, an exception detection engine 1301 is triggered to check the incident maps 1302 to determine the best possible incident, named candidate incident X, which this exception may point to. The rules provided in the incident map of the candidate incident 1303 are followed and tested 1304. The rules may involve checking for more exceptions and/or retrieving other meta data. An incident Classifier 1306 is provided that receives the outputs of rule tests 1305 and feeds the output 1305 into the incidents network 1210 to determine the incident class 1307. A visualization is provided where the detected Incident Class 1307 along with details on the executed rules are relayed to the user.

A tracking daemon may be employed that periodically checks on the parameters in the incident map 1303 and looks if any of the exception conditions specified in the incident map 1303 are satisfied. If so, occurrence of such additional exceptions as part of the same incident are notified to the user on a mobile/desktop interactive visualization. A summary of the incident is generated and is presented on the mobile/desktop interface. This summary includes and is not limited to incident type, time, location map; exceptions included in the incident along with the time series and geographical information; and status of incident in terms of being active, under investigation, or closed.

Figure 14:
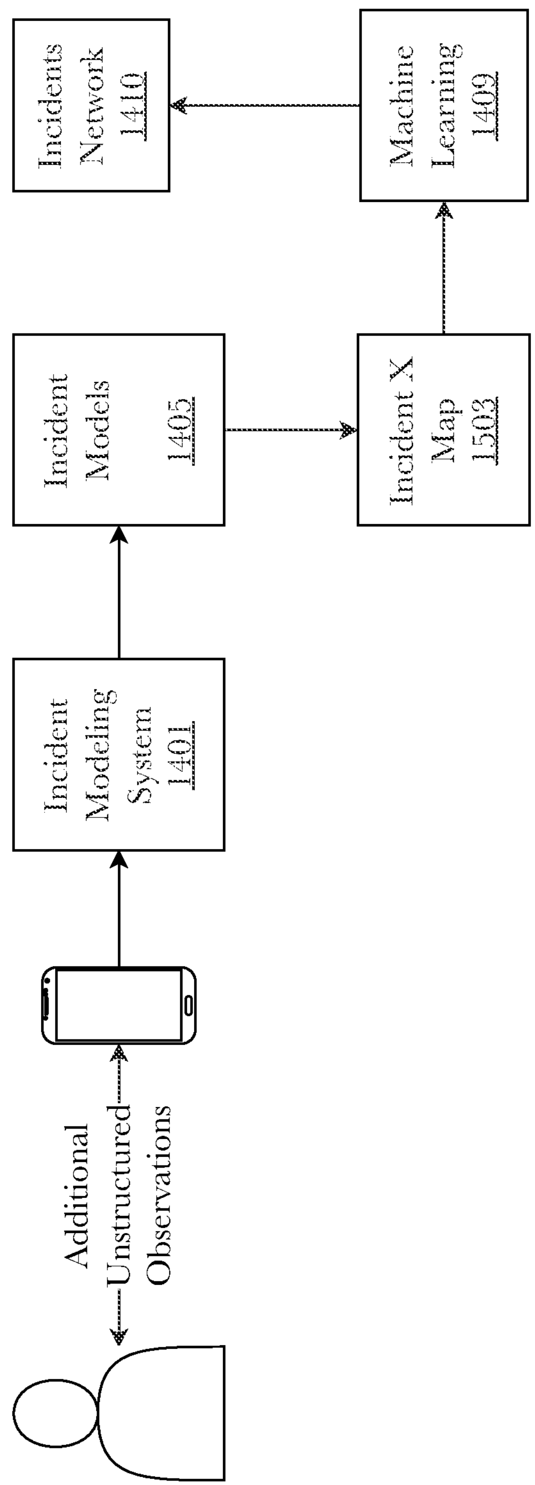
FIG. 14 is a flow diagram illustrating how an industrial virtual assistant learns from unstructured information and adds that to an incident map for future retrieval.

FIG. 14 is a flow diagram illustrating how an industrial virtual assistant learns from unstructured information and adds that to an incident map for future retrieval. Following from FIG. 13, a visualization interface may be used to capture additional situations observed during the incident that may or may not be directly captured by automated and measured data. Such inputs may include on-the-ground observations such as "traffic disruption," "additional services disruption," "foul smell or taste" etc. Such inputs may be provided via structured text or speech. Inputs may be taken from the conversation and used to generate a structured representation of the incident criteria called incident models 1405 via an incident modeling system 1401. A data model named incident map 1503 may be provided to represent various criteria rules related to different incidents and on which parts of the system (sensors, geographic locations, etc.) these rules apply. The incident models 1405 are ingested into an incident map 1503 via an incident mapping system modeling system 1401. A machine learning method 1409 generates an incident network 1410. Supervised or unsupervised machine learning may be used. Some machine learning methods may be preferred such as an artificial neural network, deep learning network, or a decision tree network which may be used to learn from multiple criteria rules related to the same incident. Each time an incident is detected using an existing criterion or a new criterion is provided by the user, the machine learning method is employed to update the underlying machine learning model using the most up-to-date incident map 1503.

This computer method passes these additional inputs to an incident mapping system 1405 to be captured in the incident network 1410.

Figure 15:
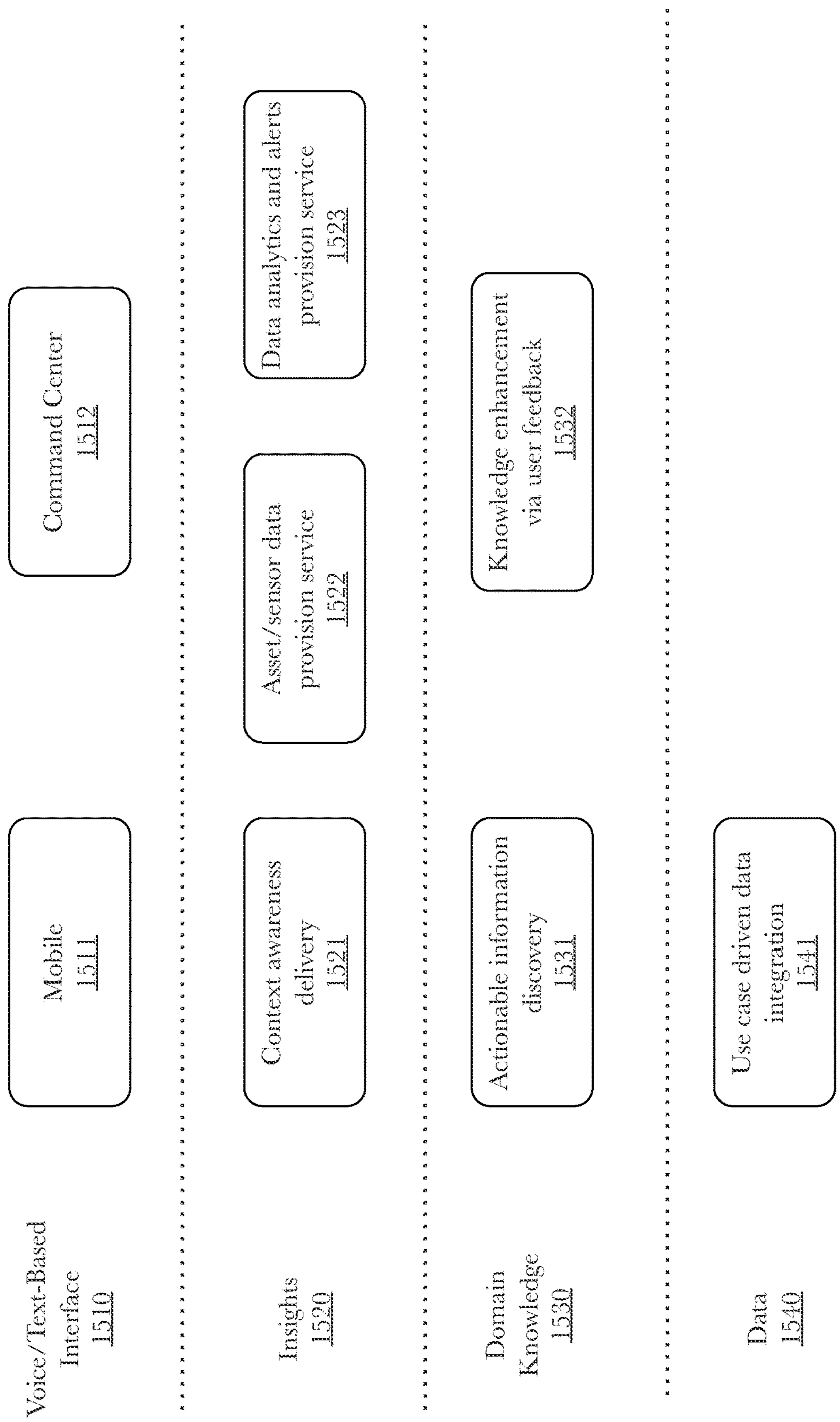
FIG. 15 is a block diagram illustrating an exemplary backend architecture process for a distributed industrial virtual assistant platform.

FIG. 15 is a block diagram illustrating an exemplary backend architecture for a distributed industrial virtual assistant platform 200. The system output is an adaptive industrial virtual assistant (WA) that defines domain specific concepts and contexts and can easily extract the relevant insights from the backend databases. For example, a user who may be a facility manager/engineer might ask (by voice or text) the industrial virtual assistant that is installed on his or her mobile device what the fluid pressure is within in a certain pumping station which is at a certain geographical location and at a specific time. In this case, the industrial virtual assistant has the relevant domain expertise to understand the correct meaning of the technical terms: "fluid pressure in the pumping station." And with this understanding, the virtual assistant can find the relevant asset ID in the GIS data, locate the relevant fluid pressure sensor ID in a SCADA system, and extract the relevant fluid pressure data at the requested geographical location and at the required time point. Thereafter, the industrial virtual assistant will respond to the user (voice or text) with the following answer: "the fluid pressure in pump x in location y and at time z is w psi."

The industrial virtual assistant navigates back and forth through the components spanning from an initial data layer 1540 to a voice/text-based user interface 1510. The data layer comprises at least use case driven data integration 1541 which directly informs the actionable information discovery 1531 and the knowledge enhancement 1532 of the domain knowledge layer 1530. An insights layer 1520 provides context awareness delivery 1521, an asset/equipment/sensor data provision service 1522, and a data analytics and alerts provision service 1523. User's may make queries from mobile devices 1511, workstations, within specific rooms or buildings (e.g., command center 1512), and other specific devices and areas.

Figure 16:
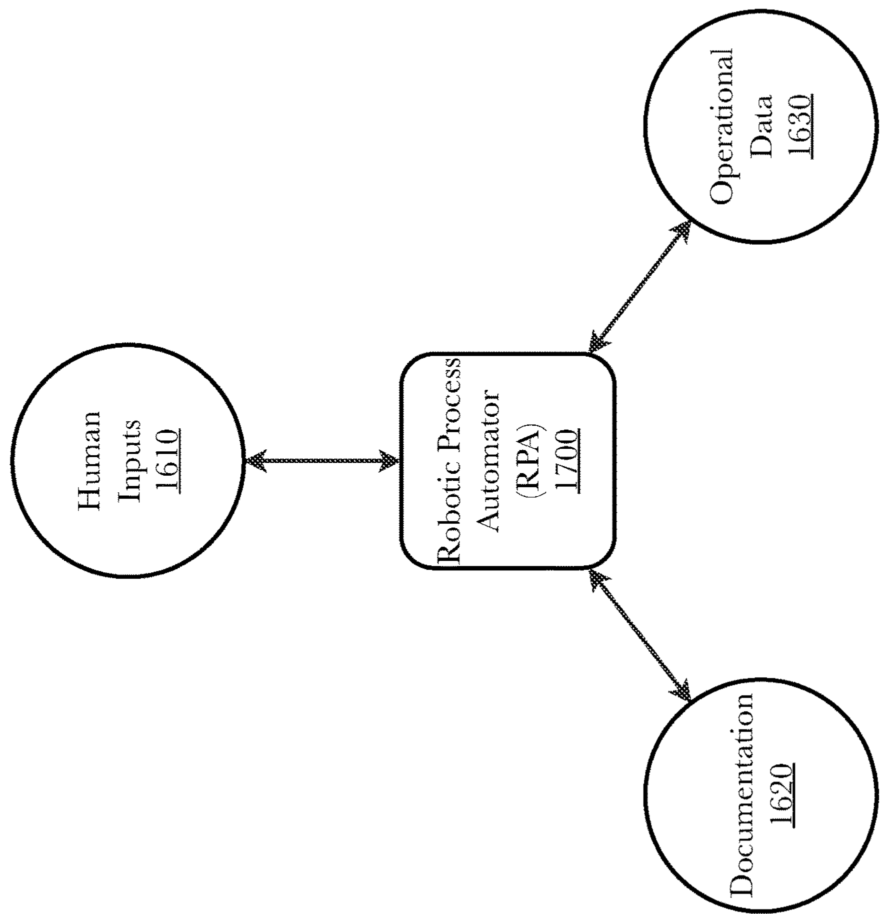
FIG. 16 is a diagram showing integration of exemplary knowledge sources of an industrial facility by a robotic process automater.

FIG. 16 is a diagram showing integration of exemplary knowledge sources of an industrial facility by a robotic process automater. While knowledge sources for an industrial facility are many, one way to classify them is in terms of human inputs 1610, documentation 1620, and operational data 1630. Human inputs 1610 to robotic process automater 1700 are any changes, updates, or interactions with equipment, systems, or processes of a facility, or any interactions with an IVA platform 200 associated with such equipment, systems, or processes including but not limited to queries, comments, changes, updates, or notations about equipment, systems, or processes of the facility. Documentation 1620 inputs to robotic process automater 1700 are any form of documentation about equipment, systems, or processes of a facility including but not limited to equipment manuals, user manuals, process manuals, operational instructions, and other facilities documentation such as that described for facilities database 540. Operational data 1630 for inputs to robotic process automater 1700 are any real-time, near-real-time, or stored data from equipment, sensors, logs, or other data-producing devices associated with a facility. Taken together, these three broad classifications of data provide robotic process automater 1700 with information about expected behavior of equipment, systems, or processes in the form of documentation 1620, actual behavior of equipment, systems, or processes in the form of operational data 1630, and corrections to, or modifications of, equipment, systems, or processes in the form of human inputs 1610, which may then be incorporated into a knowledge graph showing the relationships between expectations, actual behaviors, and corrections or modifications, and machine learning algorithms may be applied to the knowledge graph to make predictions about future behaviors of equipment, systems, or processes in order to inform human operators or perform automated control of such equipment, systems, or processes.

Figure 17:
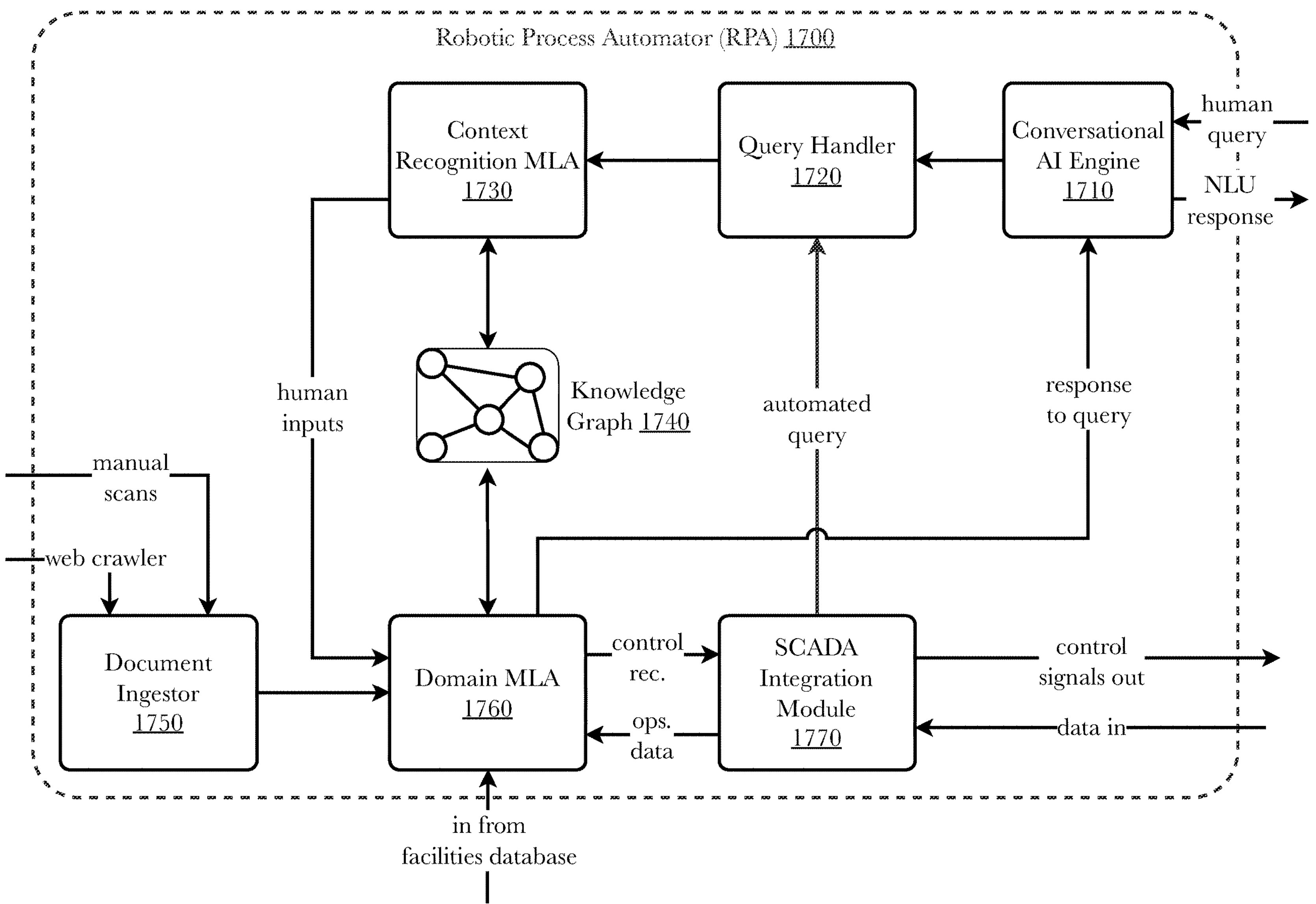
FIG. 17 is an exemplary system architecture for a robotic process automater aspect of an industrial virtual assistant.

FIG. 17 is an exemplary system architecture for a robotic process automater aspect of an industrial virtual assistant. Robotic process automater (RPA) 1700 allows operational staff at industrial facilities to have natural language conversations to obtain information about, and to control operations of, industrial facilities, and which automates certain processes based in part on those natural language conversations. Robotic process automater (RPA) 1700 ingests information from human inputs 1610, documentation 1620, and operational data 1630 from a facility, organizes that information into a knowledge graph containing comprehensive facility information, and applies machine learning algorithms to the knowledge graph to provide natural language responses to human queries and to automate certain processes of the facility. Depending on configuration, robotic process automater (RPA) 1700 may either operate independently from Industrial Virtual Assistant (WA) platform 200 as a stand-alone system, or may be a component or aspect of Industrial Virtual Assistant (IVA) platform 200. In this exemplary architecture, robotic process automater (RPA) 1700 is shown as a stand-alone system comprising a conversational AI engine 1710, a query handler 1720, a context recognition machine learning algorithm 1730, a knowledge graph 1740, a document ingester 1750, a domain machine learning algorithm 1760 and a SCADA integration module 1770.

Conversational AI engine 1710 has functionality similar to natural language processing engine 310 described in other embodiments. Conversational AI engine 1710 receives user communications in the form of voice and/or text. Conversational AI engine 1710 uses speech recognition algorithms to convert any voice communications to text, and then uses domain-specific NLP machine learning algorithms to parse the text to understand the context of the communication (e.g. query for information, a control or configuration command, etc.) and to identify the assets, equipment, or resources to which the communication is directed (e.g., pump X, valve Y, etc.). Conversational AI engine 1710 may comprise domain-specific NLP machine learning algorithms that may be trained using sample user communications or customer-specific taxonomies in conjunction with the domain-specific and facility-specific information (for example, as might be contained in domain-specific knowledge database(s) 520, facilities database(s) 540) and/or knowledge graph 1740).

Query handler 1720 has functionality similar to query handler 510 described in other embodiments. Query handler 1720 receives domain-specific or facility-specific queries or commands from the conversational AI engine 1710 or domain-specific or facility-specific automated queries or commands from domain MLA 1760, retrieves relevant information from knowledge graph 1740 (for example, if a query contains the word Pump A, query handler 1720 may retrieve the specifications or identifier for Pump A from knowledge graph 1720), and passes the query and retrieved information to context recognition machine learning algorithm 1730.

Context recognition machine learning algorithm 1730 has functionality similar to context machine learning algorithm (s) 604 of other embodiments. Context recognition machine learning algorithm 1730 receives queries and processes them to learn new information about the context in which a query was made so as to facilitate generalization of that learning to other similar contexts. For example, if a facilities engineer makes a query about lowering the operating pressure of a given pump to 90 psi at a particular time each day, the system can learn that the pressure for that pump should be lowered each day at that time, and can either prompt the engineer to do so, ask the engineer if that procedure should be implemented automatically each day, or automatically implement that process once a threshold level of certainty about that context has been reached. Likewise, if a different engineer is working on a given day, the system can notify the different engineer that the other engineer usually lowers the pump pressure at that time each day. This learning information can be stored in a database (e.g., context learning database 604), and the learning outcomes as described above may be stored or forwarded to other relevant system components (e.g., for example, forwarded to domain expertise manager 500 for incorporation into the domain-specific knowledge database 520). More information is described above about machine learning models that may be used by the IVA platform.

Knowledge graph 1740 is a database in graph form that stores complex relationships between things and events. A knowledge graph is comprised of nodes and edges, wherein the nodes represent things (any type of thing, whether tangible or not, including but not limited to concepts, entities, and events) and the edges represent relationships between the things (including but not limited to inferred relationships or insights derived from the outputs of machine learning algorithms). Both nodes and edges of a knowledge graph may contain additional data about the things (for example, that the pump represented by the node operates as 15 psi or that the relationship between nodes is of a certain character) and may further contain additional information about the node or edge itself (often called metadata such as the number of edges connected to a given node). Knowledge graphs thus represent a scalable, comprehensive set of knowledge about a certain topic such as a facility and its operations. As knowledge graphs are a type of graph, any graph-based analyses can be performed on them (e.g., shortest path analyses, least cost analyses, etc.). Consequently, knowledge graphs are ideal forms of data storage for processing by machine learning algorithms.

Domain machine learning algorithm 1760 has functionality similar to domain machine learning algorithm(s) 602 of other embodiments. Domain machine learning algorithm 1760 receives information of the three types described above (human inputs 1610, documentation 1620, and operational data 1630) and processes them to learn new information and obtain insights about any aspect of a facility or its operations. Domain machine learning algorithm 1760 incorporates the received data and any new information or insights into knowledge graph 1740 to provide a comprehensive set of knowledge about the facility. Information and insights may be generalized by the domain MLA to similar types of equipment or similar contexts within the facility, allowing automated predictions and recommendations about facility equipment and operations. More information is described above about machine learning models that may be used by the IVA platform. In addition, through combining three pieces of knowledge, ML also helps to identify the currency of information (i.e., whether information is current or outdated) and hence is able to provide more relevant and current information when asked.

Domain machine learning algorithm 1760 is configured to receive facilities-related documents from document ingester 1750 which may include manual scans of operator's manuals, technical specifications, data sheets, procedures, and similar materials or already-digitized versions of such documents (e.g., in Portable Document Format (PDF) form) or materials obtained from the Internet from document ingester's 1750 web crawler. Domain machine learning algorithm 1760 may also receive information about the facility itself from a facilities database (e.g., facilities database 540) such as the types and numbers of equipment installed, the operating capacities of such equipment, operating limits, alarms, and thresholds, processing capacities, nameplate ratings, etc.

Domain machine learning algorithm 1760 is connected to SCADA integration module 1770 which allows ingestion of real-time, near-real-time, or stored operational data from equipment, sensors, logs, or other data-producing devices associated with a facility. Domain machine learning algorithm 1760 is configured to incorporate such operational data and any learned information or insights into knowledge graph 1740. Outputs of domain machine learning algorithm 1760 may include automated control recommendations for equipment which are converted by SCADA integration module 1770 to equipment control signals.

SCADA integration module 1770 has functionality similar to context machine learning algorithm(s) 330 of other embodiments. SCADA integration module 1770 is configured to receive and transmit data and control commands between a facility's SCADA system and robotic process automater (RPA) 1700. As described above, the core of operational control of modern industrial facilities are supervisory control and data acquisition (SCADA) systems. SCADA systems comprise programmable logic controllers (PLCs) and remote terminal units (RTUs) which are microcomputers that are connected with the equipment 140 and sensors 150 throughout the facility. Depending on their configuration, the PLCs and RTUs acquire data from equipment, control equipment, or both. The PLCs and RTUs are connected to SCADA software that allows for monitoring of, and control of, the equipment, allowing for sophisticated, computer-controlled processes to be implemented on the equipment.

Figure 18:
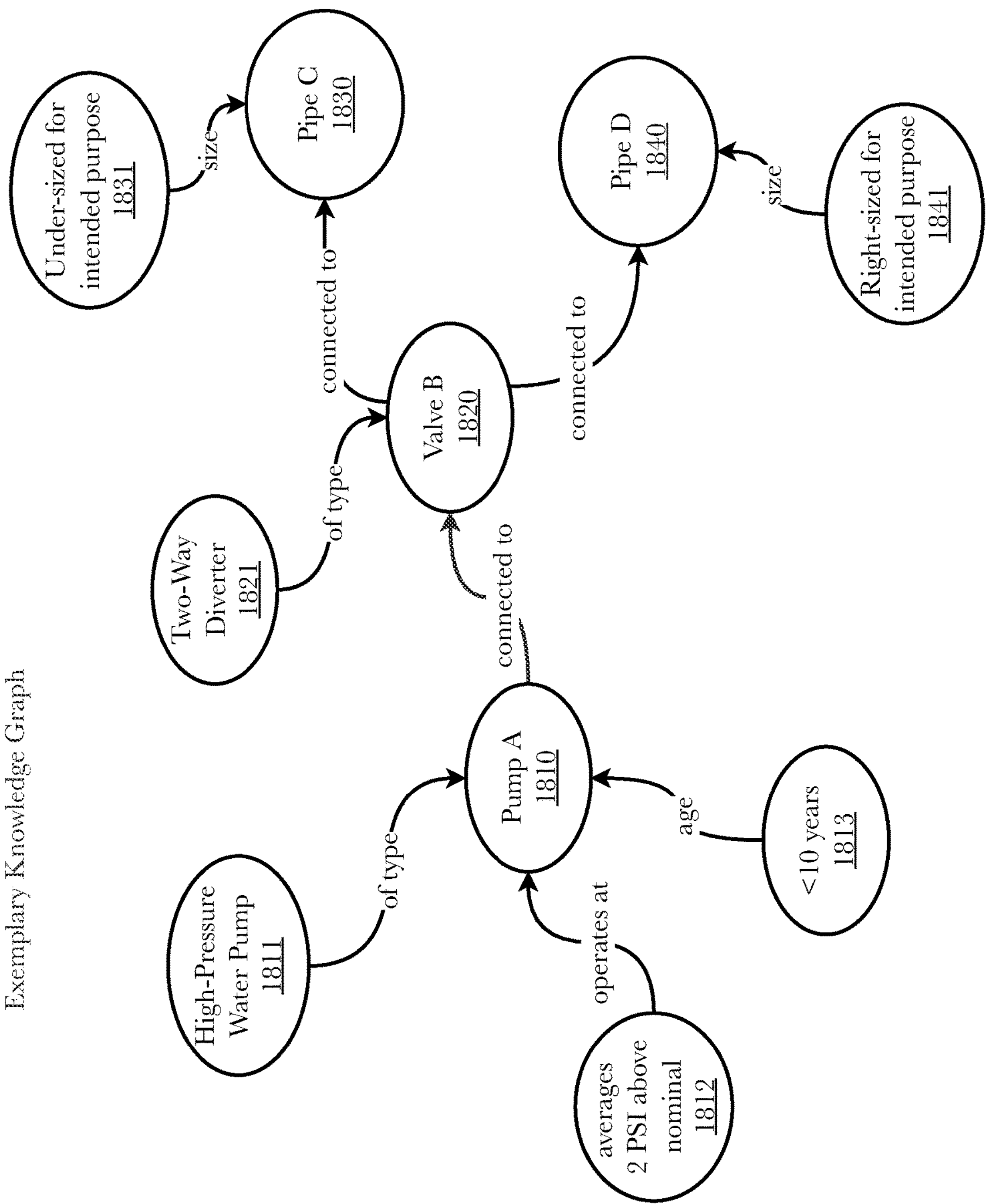
FIG. 18 is an exemplary knowledge graph of the type that may be used by an industrial virtual assistant with robotic process automation.

FIG. 18 is an exemplary knowledge graph of the type that may be used by an industrial virtual assistant with robotic process automation. In this example, a very simple water system is shown comprising a pump A 1810, a valve B 1820, a pipe C 1830, and a pipe D 1840, which are entities in the knowledge graph. Pump A 1810 has several descriptor nodes associated with it connected by labeled edges which further describe the pump. For example, pump A 1810 is a high-pressure water pump 1811 which tends to operate at 2 psi above its nominal (or nameplate) pressure 1812, and which is less than 10 years old 1813. Similarly, valve B 1820 is described by a node and edge as being a two-way diverter valve. Pump A 1810 is connected to valve B 1820, which is further connected to pipe C 1830 and pipe D 1840. Pipe C is described by a node and edge as being undersized for its intended purpose 1831 and pipe D is described by a node and edge as being right-sized for its intended purpose. A machine learning algorithm run on this knowledge graph may make the inference that when water is diverted through valve B 1820 to pipe C 1830, the pressure at pump A 1810 may be higher than expected due to the undersizing 1831 of pipe C 1830 for its purpose. Additional context added to the graph may explain that the average of 2 psi above normal 1812 of pump A 1810 is due to the period of time when valve B 1820 is switched to pipe C 1830. Taken together, this knowledge graph provides a comprehensive set of knowledge of this simple system, and the concept may be scaled up to systems of any size.

Figure 19:
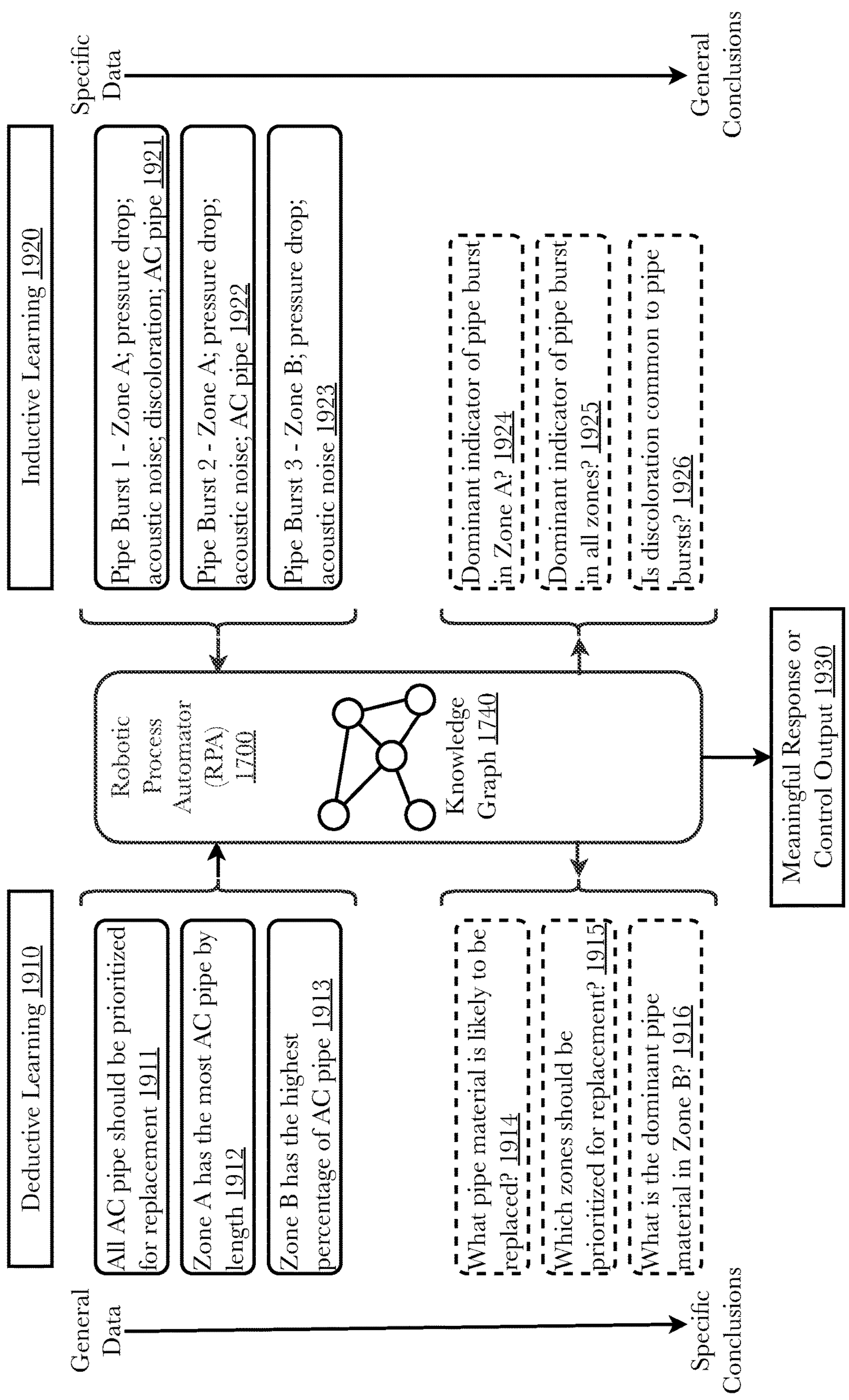
FIG. 19 is a diagram showing an exemplary application of a robotic process automater aspect of an industrial virtual assistant.

FIG. 19 is a diagram showing an exemplary application of a robotic process automater aspect of an industrial virtual assistant. In this example, a robotic process automater (RPA) 1700 is applied to a water system. RPA 1700 uses both deductive learning 1910 and inductive learning 1920 to evaluate the system, generate new information and insights, respond to queries, and automate processes. Deductive learning involves taking general data and forming specific conclusions by formulating a hypothesis and testing the hypothesis against the data. Inductive learning involves taking specific data and forming general conclusions by recognizing patterns within the data. In this example, RPA 1700 takes general data about the system such as "all asbestos cement (AC) pipe should be prioritized for replacement" 1911, "Zone A has the most asbestos cement (AC) pipe by length" 1912, and "Zone B has the highest percentage of AC pipe" 1913, stores that information in knowledge graph 1740, and runs machine learning algorithms on the data to obtain inferences and further insights to enable responses to specific queries such as "what pipe material is likely to be replaced?" 1914, "which zones should be prioritized for replacement?" 1915, and "what is the dominant pipe material in Zone B?" In this example, RPA further takes specific data about the system such as pipe burst events and analyzes them to form general conclusions about the system. Here, the specific data about pipe bursts includes Pipe Burst 1 data 1921 having the characteristics of being in Zone A, having a pressure drop, being associated with acoustic noise, having water discoloration complaints from consumers, and being made of AC pipe, Pipe Burst 2 data 1922 having the characteristics of being in Zone A, having a pressure drop, being associated with acoustic noise, and being made of AC pipe, Pipe Burst 3 data 1923 having the characteristics of being in Zone B, having a pressure drop, and being associated with acoustic noise. RPA 1700 stores that information in knowledge graph 1740, runs machine learning algorithms on the data to obtain inferences and further insights to create general conclusions about the system that can be used to respond to queries such as "what is the dominant indicator of pipe bursts in Zone A?" 1924, "what is the dominant indicator of pipe bursts in all zones?" 1925, and "is discoloration common to all pipe bursts?" 1926. The inferences and insights gained from the deductive learning 1910 and inductive learning 1920 are also stored in the knowledge graph, and allow RPA 1700 to provide context-specific and domain-specific meaningful responses to queries or to automate controls.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 20:
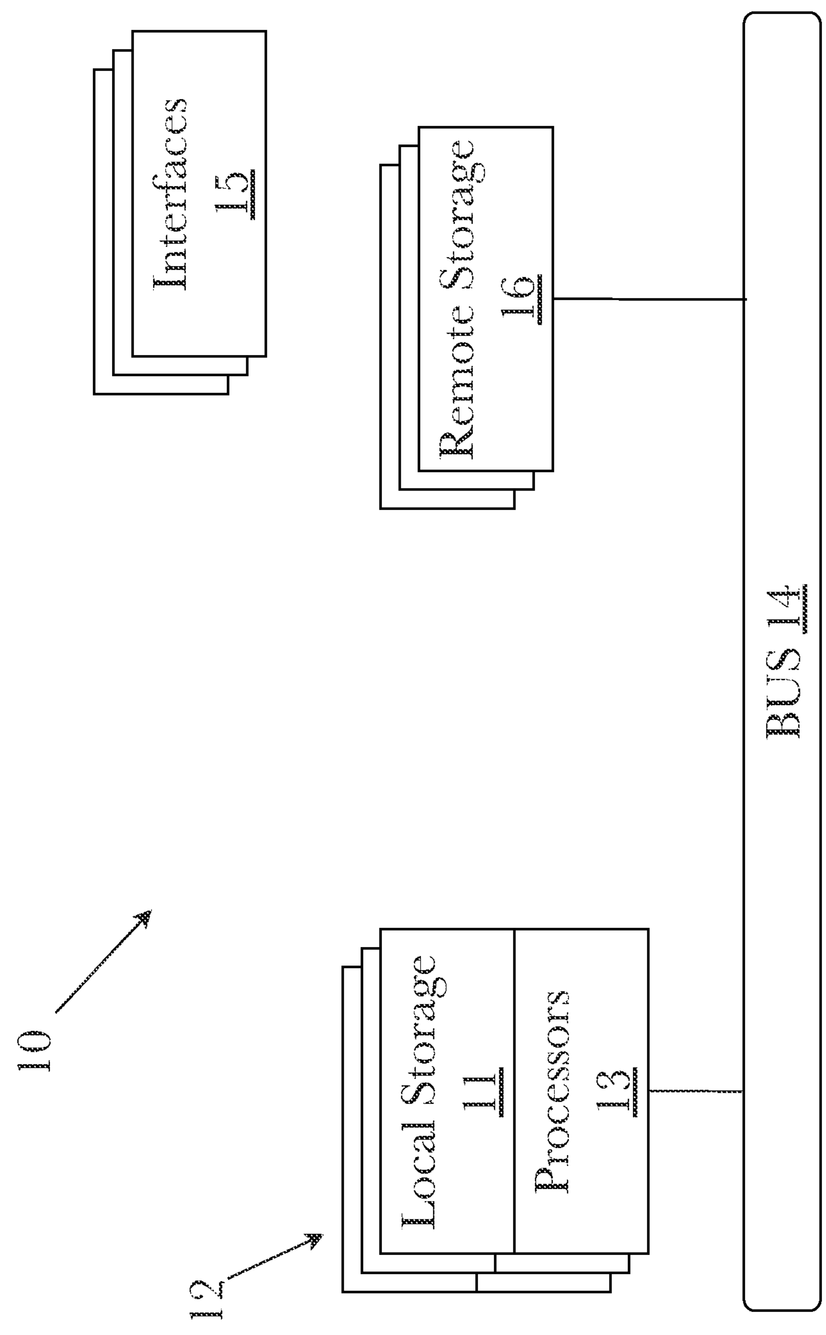
FIG. 20 is a block diagram illustrating an exemplary hardware architecture of a computing device.

Referring now to FIG. 20, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 20 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 21:
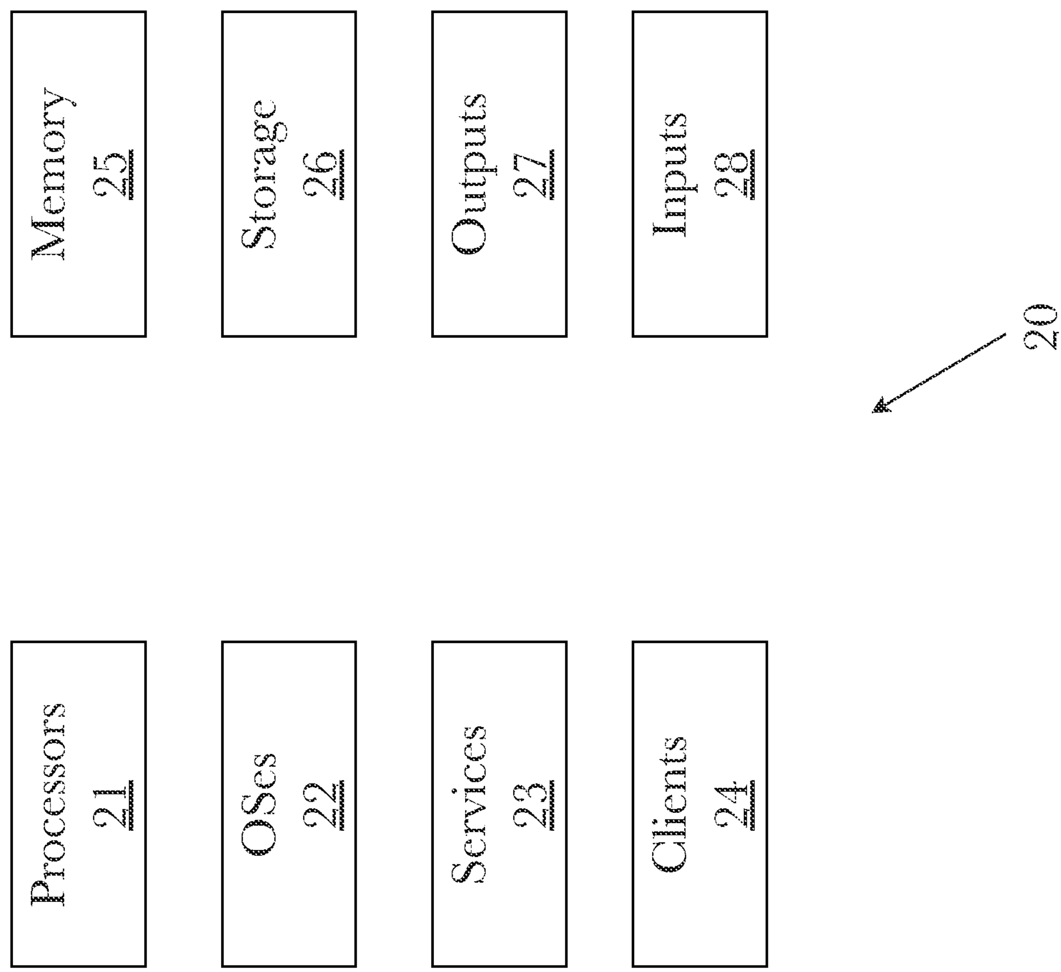
FIG. 21 is a block diagram illustrating an exemplary logical architecture for a client device.

In some aspects, systems may be implemented on a standalone computing system. Referring now to FIG. 21, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20 and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 20). Examples of storage devices 26 include flash memory, magnetic hard drive, CD-ROM, and/or the like.

Figure 22:
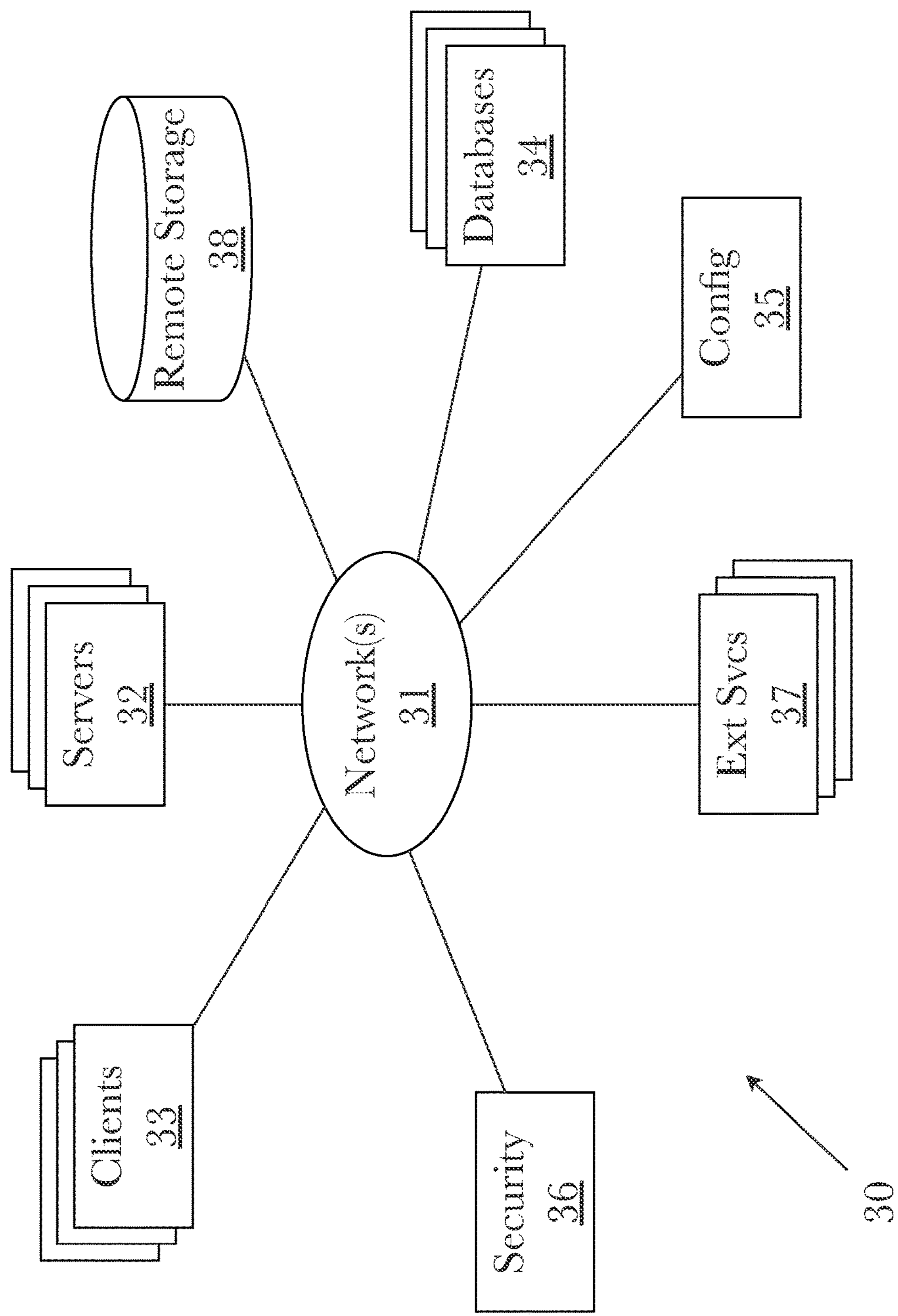
FIG. 22 is a block diagram showing an exemplary architectural arrangement of clients, servers, and external services.

In some aspects, systems may be implemented on a distributed computing network, such as one having any number of clients and/or servers. Referring now to FIG. 22, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 21. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as Wi-Fi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation unless a specific security 36 or configuration system 35 or approach is specifically required by the description of any specific aspect.

Figure 23:
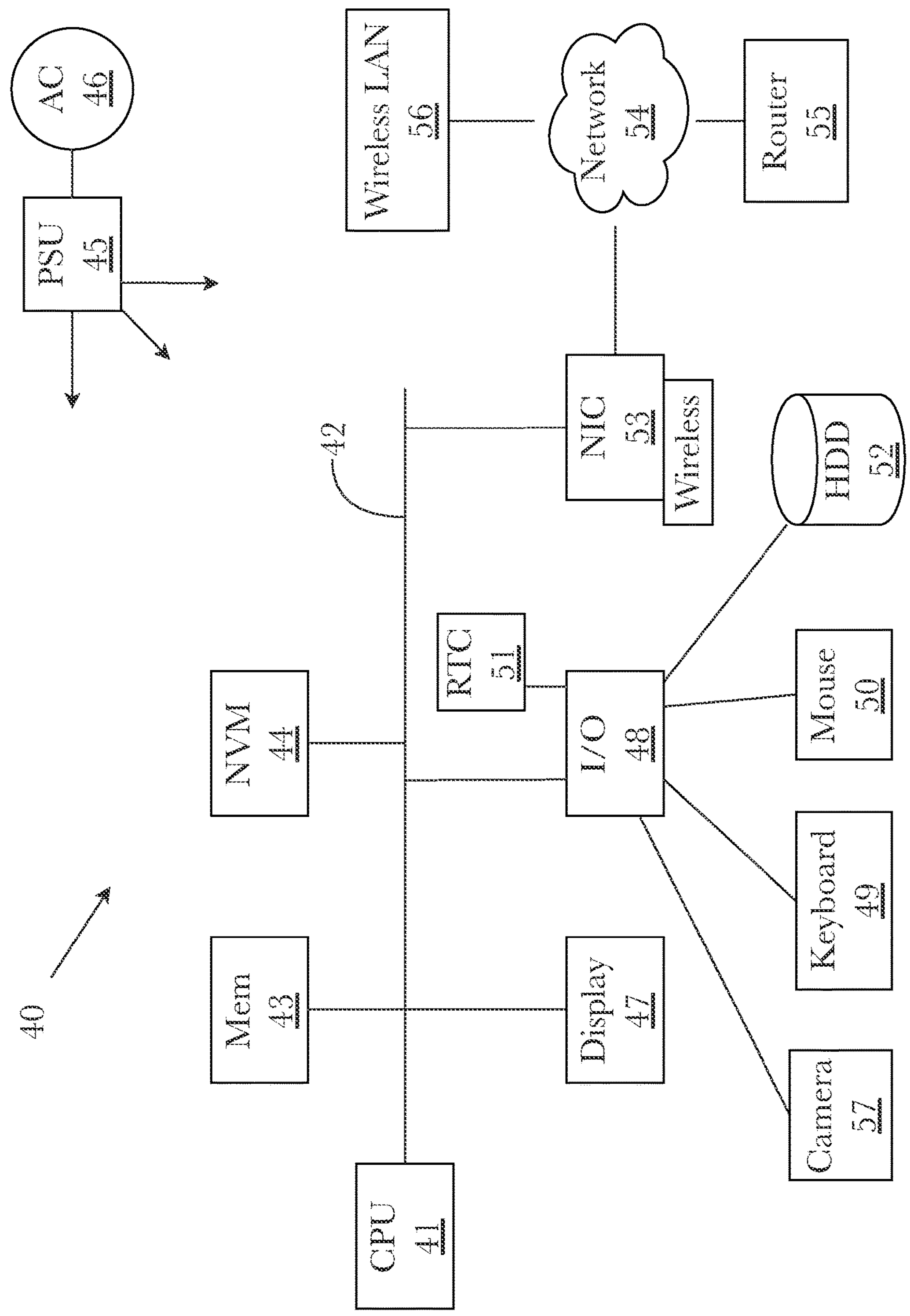
FIG. 23 is another block diagram illustrating an exemplary hardware architecture of a computing device.

FIG. 23 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A robotic process automation system, comprising:
- a computing device comprising a memory, a processor, and a non-volatile data storage device;
- a knowledge graph stored on the non-volatile data storage device, wherein the knowledge graph comprises nodes representing things and edges representing relationships between the things;
- a robotic process automater comprising a first plurality of programming instructions stored in the memory which, when operating on the processor, causes the computing device to:
  - receive data about a facility to be automated, the data comprising:
    - one or more human inputs;
    - one or more documents; and
    - one or more operational data streams from the system;
  - store the received data in the knowledge graph;
  - process a portion of the knowledge graph through a domain machine learning algorithm to obtain an inference about the facility not contained in the received data;
  - store the inference as part of the knowledge graph;
  - receive a query about the facility related to the inference;
  - process the query and a portion of the knowledge graph through a context recognition machine learning algorithm to determine a context in which the query was made;
  - process the context and a portion of the knowledge graph through the domain machine learning algorithm to:
    - generate a response to the query; and
    - determine whether the inference can be generalized to the context of the query; and
  - store the determination as part of the knowledge graph.

2. The system of claim 1, wherein the query is a natural language query from a person and the response is provided as a natural language response using a natural language understanding (NLU) engine.

3. The system of claim 2, wherein the natural language understanding (NLU) engine comprises a natural language processing machine learning algorithm trained in part on a domain-specific taxonomy for a domain related to the facility.

4. The system of claim 3, wherein the natural language processing machine learning algorithm is further trained on information from the knowledge graph to enhance its domain-specific taxonomy recognition.

5. The system of claim 1, wherein the query is an automated query from a component of the facility and the response is a control recommendation sent to a supervisory control and data acquisition (SCADA) module to generate a control signal.

6. The system of claim 1, wherein the information from the inferences about the facility stored in the knowledge graph are analyzed over time to identify long term patterns which have not been provided by the received data about the facility.

7. A method for operating a robotic process automation system, comprising the steps of:
- storing a knowledge graph a non-volatile data storage device of a computing device comprising a memory, a processor, and a non-volatile data storage device, wherein the knowledge graph comprises nodes representing things and edges representing relationships between the things;
- using a robotic process automater operating on the computing device to:
  - receiving data about a facility to be automated, the data comprising:
    - one or more human inputs;
    - one or more documents; and
    - one or more operational data streams from the system;
  - store the received data in the knowledge graph;
  - process a portion of the knowledge graph through a domain machine learning algorithm to obtain an inference about the facility not contained in the received data;
  - store the inference as part of the knowledge graph;
  - receive a query about the facility related to the inference;
  - process the query and a portion of the knowledge graph through a context recognition machine learning algorithm to determine a context in which the query was made;

process the context and a portion of the knowledge graph through the domain machine learning algorithm to:

generate a response to the query; and determine whether the inference can be generalized to the context of the query; and store the determination as part of the knowledge graph.

8. The method of claim 7, wherein the query is a natural language query from a person and the response is provided as a natural language response using a natural language understanding (NLU) engine.

9. The method of claim 8, wherein the natural language understanding (NLU) engine comprises a natural language processing machine learning algorithm trained in part on a domain-specific taxonomy for a domain related to the facility.

10. The method of claim 9, wherein the natural language processing machine learning algorithm is further trained on information from the knowledge graph to enhance its domain-specific taxonomy recognition.

11. The method of claim 7, wherein the query is an automated query from a component of the facility and the response is a control recommendation sent to a supervisory control and data acquisition (SCADA) module to generate a control signal.

12. The method of claim 7, wherein the information from the inferences about the facility stored in the knowledge graph are analyzed over time to identify long term patterns which have not been provided by the received data about the facility.

* * * * *